(12) United States Patent
Uchida et al.

(10) Patent No.: US 7,468,941 B2
(45) Date of Patent: Dec. 23, 2008

(54) RECORDING AND REPRODUCING APPARATUS

(75) Inventors: Akiyoshi Uchida, Kawasaki (JP); Toshikazu Kanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 723 days.

(21) Appl. No.: 11/196,055

(22) Filed: Aug. 3, 2005

(65) Prior Publication Data

US 2006/0203690 A1    Sep. 14, 2006

(30) Foreign Application Priority Data

Mar. 11, 2005    (JP) ............................. 2005-069400

(51) Int. Cl.
*G11B 7/00* (2006.01)
(52) U.S. Cl. ...................................... 369/103
(58) Field of Classification Search ................. 369/103; 359/22

See application file for complete search history.

(56) References Cited

U.S. PATENT DOCUMENTS 6,844,927 B2 *    1/2005   Stokowski et al. ........ 356/237.1

FOREIGN PATENT DOCUMENTS

JP         2004-158114        6/2004

\* cited by examiner

*Primary Examiner*—Nabil Z Hindi
(74) *Attorney, Agent, or Firm*—Greer, Burns & Crain, Ltd.

(57) ABSTRACT

A recording and reproducing apparatus according to the present invention includes a light source for emitting a light beam, a spatial modulating part for modulating the light beam to create information light, using spatial information associated with page data A to be recorded on a holographic recording medium, an optical-path changing part for changing an optical path of the information light created by the spatial modulating part, a light detecting part for receiving the information light having the optical path changed by the optical-path changing part, and a diagnosis part for inspecting operations of recording and reproducing components including the spatial modulating part and the light detecting part, using the page data A and page data B obtained from the information light received by the light detecting part.

16 Claims, 18 Drawing Sheets

INFORMATION LIGHT

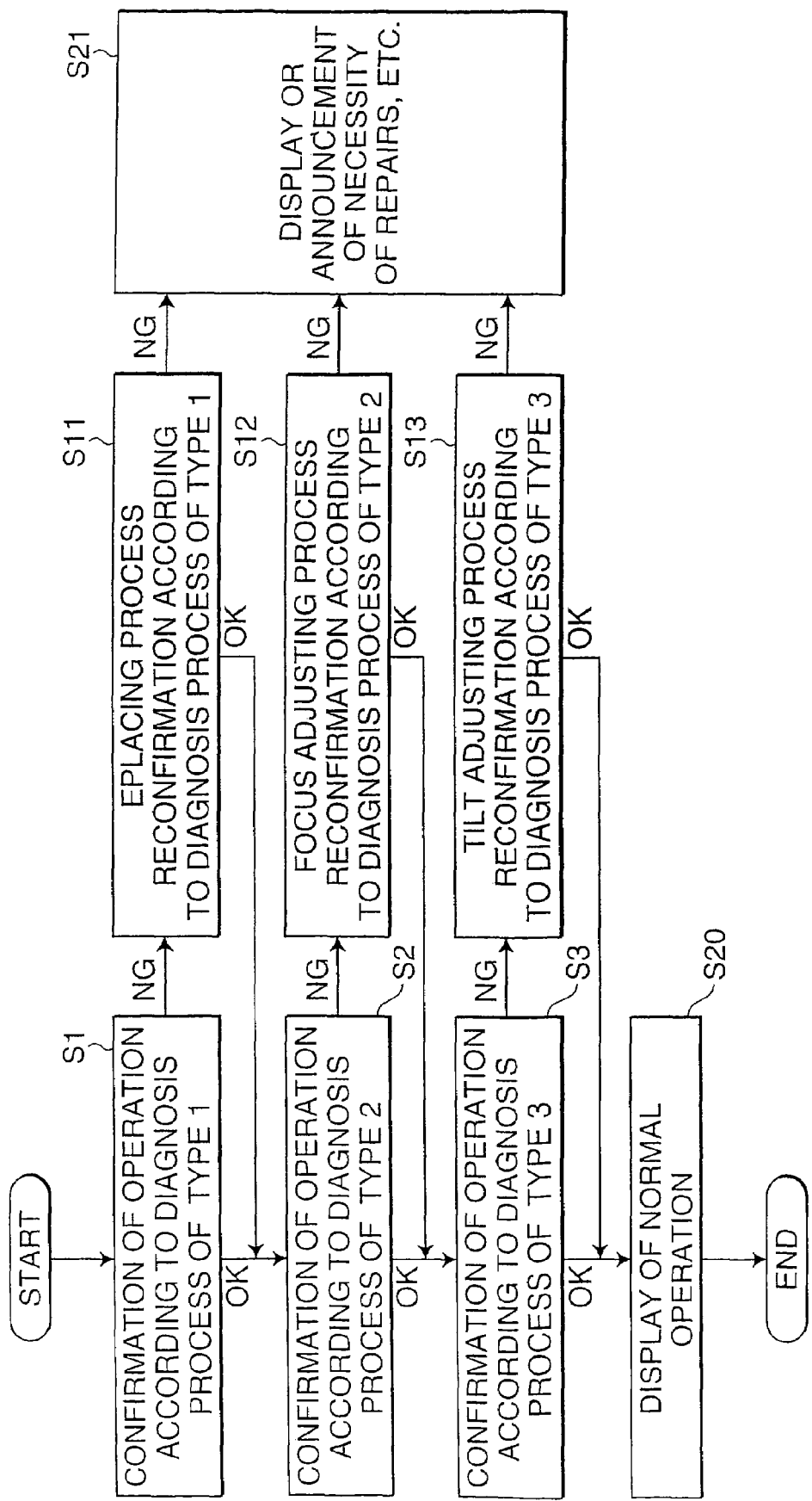

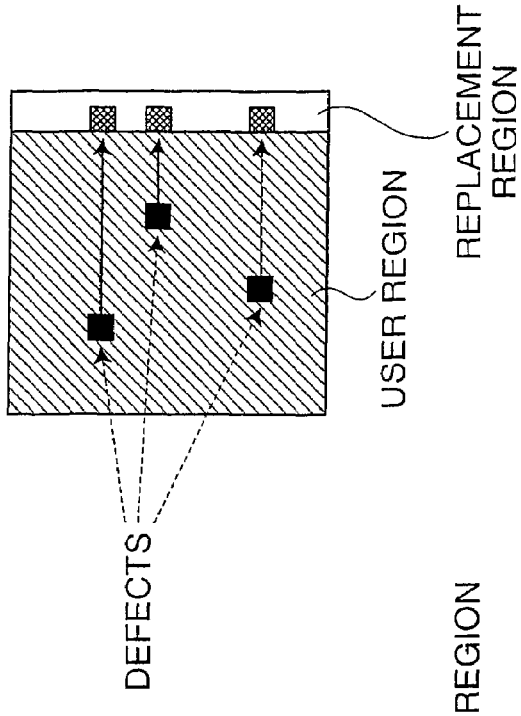
FIG.8C REPLACEMENT OF DATA AT DEFECTIVE POSITIONS
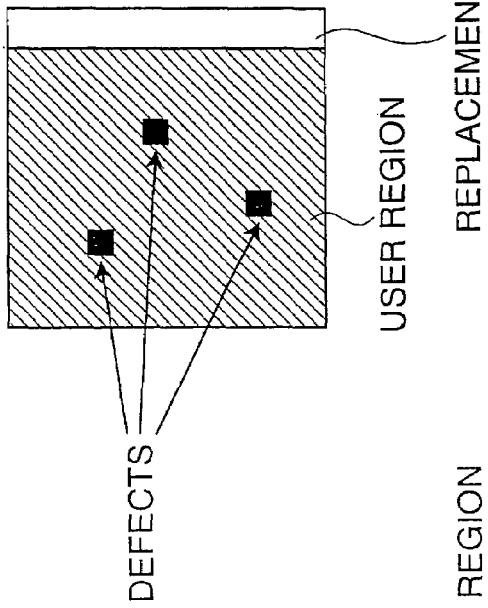
FIG.8B IMAGE PICKUP PATTERN OF TWO-DIMENSIONAL IMAGE PICKUP DEVICE
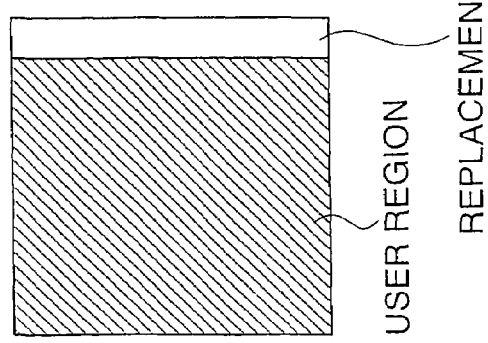
FIG.8A PATTERN OF SPATIAL MODULATOR WHEN FOCUS IS ABNORMAL IMAGE PICKUP PATTERN OF TWO-DIMENSIONAL IMAGE PICKUP DEVICE

PATTERN C (≠PATTERN A)

WHEN FOCUS IS NORMAL IMAGE PICKUP PATTERN OF TWO-DIMENSIONAL IMAGE PICKUP DEVICE

PATTERN B (=PATTERN A)

PATTERN OF SPATIAL MODULATOR

PATTERN A

PATTERN OF SPATIAL MODULATOR AT ABNORMAL: PATTERN B

PATTERN OF SPATIAL MODULATOR AT NORMAL: PATTERN A

RECORDING AND REPRODUCING APPARATUS

CROSS-REFERENCE TO RELATED APPLICATION

This application is related to Japanese patent application No. 2005-069400 filed on Mar. 11, 2005, whose priority is claimed under 35 USC § 119, the disclosure of which is incorporated by reference in its entirety.

BACKGROUND OF THE INVENTION

1. Field of the Invention

The present invention relates to a recording and reproducing apparatus. More particularly, the present invention relates to a recording and reproducing apparatus which records and reproduces data on/from a holographic recording medium and has the function of diagnosing recording and reproducing components of the apparatus.

2. Description of the Related Art

There has been suggested a holographic recording method as a method for multiplexedly recording two-dimensional information on a single position. Holographic recording means that a same position on a recording medium is irradiated with reference light and information light, an irradiation angle and wavelength of the reference light are varied to generate different interferences, and different kinds of information are multiplexedly recorded on the single position on the recording medium (refer to Japanese Unexamined Patent Application No. 2004-158114).

Optical components such as a spatial optical modulator (SLM) constituted by a liquid crystal device, a beam splitter, an optical lens, a mirror and the like are employed for recording two-dimensional information (page data) on a medium. Further, a number of optical components such as a two-dimensional image pickup device constituted by a CCD or a CMOS, a optical lens, a mirror and the like are employed for reproducing the two-dimensional information recorded on the medium.

A holographic recording and reproducing apparatus for recording digital data constituted by documents, graphics and the like as two-dimensional information may become unable to record/reproduce data on/from a medium when there are slight malfunctions, defects or adjustment failures in any of the optical components including the spatial optical modulator (SLM) and the CCD.

For example, if there is a defect in a single pixel in the CCD, this may make it impossible to perform reproduction.

Therefore, when a SLM and a CCD are utilized in a holographic recording and reproducing apparatus, they are required to have no defect.

However, a spatial optical modulator and a two-dimensional image pickup device are components having a great number of pixels as many as several million pixels; therefore, it is difficult to constantly fabricate such components with no defect. Further, a CCD which had no defect at the time of purchase may suffer from defects during usage.

A holographic recording and reproducing apparatus employing a number of complex components has a higher possibility of suffering from failures or defects than that for a conventional medium such as a CD or DVD. If such failures and the like can not be early detected, large-capacitive two-dimensional data including partial defective data will be recorded, thus causing a user to waste time.

Further, a so-called write-once type holographic recording medium may largely lose its available recording capacity when defective data is recorded thereon. This may cause the medium itself to be wasted, thus causing significant monetary and psychological damages to the user.

Consequently, particularly in the holographic recording and reproducing apparatus, it is necessary to early detect malfunctions, defects and adjustment failures in the optical components such as the CCD.

Although holographic recording and reproducing enables performing multiplex-recording only by slightly varying the incident angle of reference light with respect to a medium, if the angle adjustment is only slightly deviated from a designed value, then desired two-dimensional data can not be reproduced. In such a case, it is difficult to identify whether the impossibility of reproduction of two-dimensional page data is caused by the angle adjusting mechanism, the medium itself or the reproducing system components such as the CCD.

Consequently, in the holographic recording and reproducing apparatus, it is particularly important to early detect defects and the like in the apparatus, and if the causes of such defects can be identified to some degree prior to carrying it to a maker for repairs, user-level adjustments may be performed in some cases without carrying it to the maker for repairs. For example, if it is possible to identify whether the impossibility of reproduction is caused by the apparatus or the medium and thus it has been proven that the medium has problems, then the apparatus itself can be used continuously.

SUMMARY OF THE INVENTION

The present invention provides a recording and reproducing apparatus comprising: a light source for emitting a light beam; a spatial modulating part for modulating the light beam to create information light, using spatial information associated with page data A to be recorded on a holographic recording medium; an optical-path changing part for changing an optical path of the information light created by the spatial modulating part; a light detecting part for receiving the information light having the optical path changed by the optical-path changing part; and a diagnosis part for inspecting operations of recording and reproducing components including the spatial modulating part and the light detecting part, using the page data A and page data B obtained from the information light received by the light detecting part.

According to the present invention, there are provided the optical-path changing part and the diagnosis part, thus enabling easily detecting malfunctions in the recording and reproducing apparatus without exerting a burden on a user.

BRIEF DESCRIPTION OF THE DRAWINGS

FIG. 7 is flowchart of a defect detecting adjusting process including a combination of the self-diagnoses, according to an embodiment of the present invention;

FIGS. 8A to 8C are explanatory diagrams of a replacing process according to an embodiment of the present invention;

DESCRIPTION OF THE PREFERRED EMBODIMENTS

Figure 1:
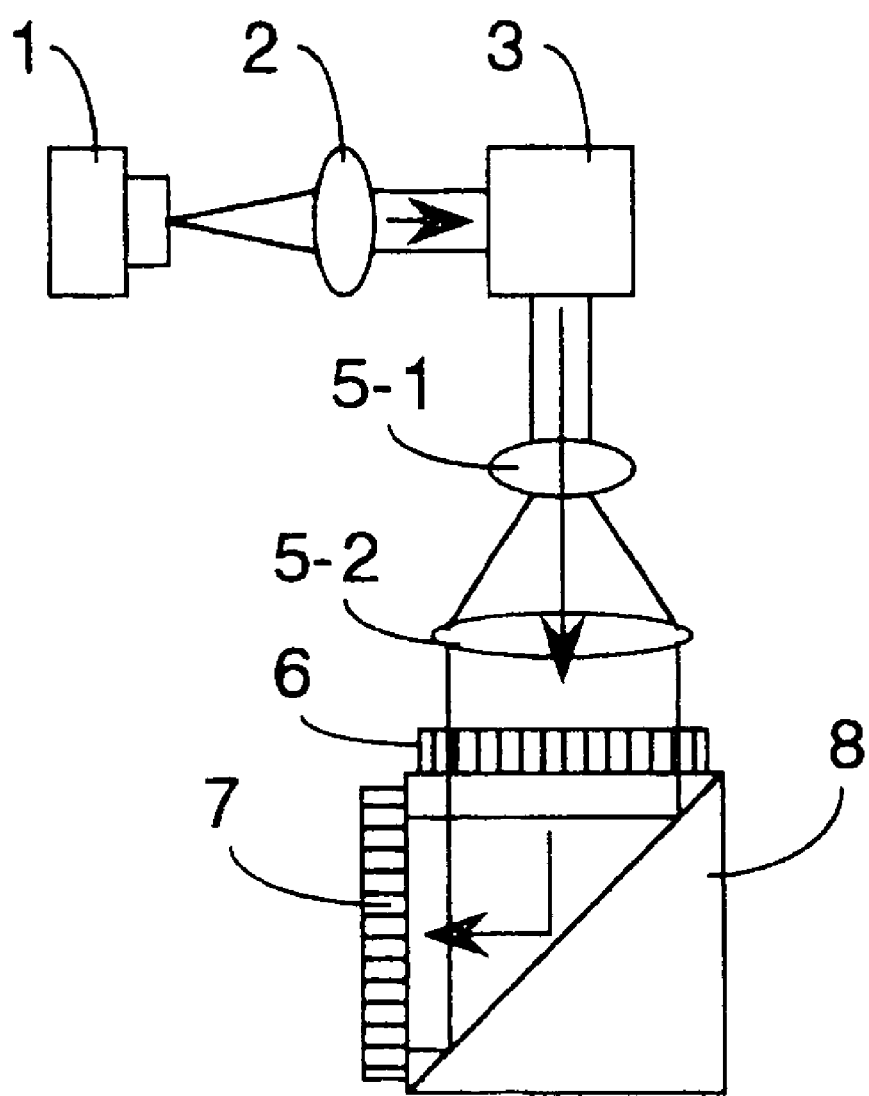
FIG. 1 is an explanatory diagram of a structure of a recording and reproducing apparatus during self-diagnosis according to a first embodiment of the present invention.

The present invention is a recording and reproducing apparatus for a holographic recording medium capable of easily and rapidly detecting malfunctions by executing self-diagnosis of the apparatus utilizing a different optical path from that for normal recording and reproducing, in general, without interposing a medium therein.

The present invention provides a recording and reproducing apparatus comprising: a light source for emitting a light beam; a spatial modulating part for modulating the light beam to create information light, using spatial information associated with page data A to be recorded on a holographic recording medium; an optical-path changing part for changing an optical path of the information light created by the spatial modulating part; a light detecting part for receiving the information light having the optical path changed by the optical-path changing part; and a diagnosis part for inspecting operations of recording and reproducing components including the spatial modulating part and the light detecting part, using the page data A and page data B obtained from the information light received by the light detecting part.

According to the present invention, there are provided the optical-path changing part and the diagnosis part, thus enabling easily detecting malfunctions in the recording and reproducing apparatus without exerting a burden on a user.

The optical-path changing part may be a beam splitter for turning the optical path of the information light created by the spatial modulating part toward the light detecting part.

Herein, the beam splitter is movably placed so as to allow the information light to travel toward a holographic recording medium during recording of page data on the medium and, so as to allow the information light to travel toward the light detecting part during inspection of the operations by the diagnosis part.

Preferably, an optical lens for directing the information light to a predetermined position on the medium is provided on the optical path of the information light between the spatial modulating part and the holographic recording medium, and the optical-path changing part is provided between the spatial modulating part and the optical lens, so that the information light is received by the light detecting part without through the optical lens.

Herein, the optical-path changing part is constituted by a mirror and a beam splitter for passing the information light created by the spatial modulating part therethrough toward the holographic recording medium while turning the optical path of the information light reflected by the mirror toward the light detecting part, and the mirror is placed between the beam splitter and the optical lens. According to this structure, it is possible to detect malfunctions mainly in the components of the spatial modulating part and the optical detecting portion, without interposing a medium.

Preferably, an optical lens for directing the information light to a predetermined position on the medium is provided on the optical path of the information light between the spatial modulating part and the holographic recording medium, and the optical-path changing part is provided between the optical lens and the medium, so that the information light passed through the optical lens is received by the light detecting part after the optical path thereof is changed by the optical-path changing part.

According to this structure, it is possible to detect malfunctions in the recording and reproducing components including the optical lens, without interposing a medium.

Herein, the optical-path changing part may be a movable mirror.

Preferably, the optical-path changing part is provided on a surface of the holographic recording medium, the optical-path changing part reflects the information light created by the spatial modulating part, and the reflected information light is received by the light detecting part. According to this structure, it is possible to detect malfunctions in the components including the medium.

Herein, the optical-path changing part may be a mirror.

Preferably, the optical-path changing part is a light transmitting part provided in the holographic recording medium, and the information light created by the spatial modulating part and directed to the light transmitting part is passed through the medium and then received by the light detecting part.

The light transmitting part is a part for emitting light from the opposite surface from the surface of incidence without causing reflection of light and corresponds to a transparent region formed form glass or the like, as will be described later.

Preferably, the diagnosis part includes a storing part which prestores page data A consisting of known information, a comparing part for comparing the page data A with page data B obtained from the information light received by the light detecting part, and a defect detecting part for detecting whether or not there is a defect in the recording and reproducing components, on the basis of the result of the comparison.

Herein, the recording and reproducing apparatus may further comprise a result outputting part for outputting the result of detection by the defect detecting part.

The recording and reproducing apparatus may further comprise a component adjusting part which, when the diagnosis part determines that there is a malfunction of the operation of any of the recording and reproducing components, adjusts the component determined to have a malfunction.

Herein, when the component determined to have a malfunction is the spatial modulating part or the light detecting part, the diagnosis part identifies the defective positions and the component adjusting part executes a replacing process for creating spatial information in which data to be recorded into the identified defective positions is shifted to a predetermined replacement region.

Preferably, the diagnosis part starts the inspection of the operations of the recording and reproducing components in the event of any of when it is detected that the power is turned on, when it is detected that a portable holographic recording medium has been inserted, when a recording request or a reproduction request is detected, every time when a constant time interval has elapsed at a state where the recording and reproducing operation is not performed, when the number of times that a malfunction of the recording operation or the reproducing operation is detected exceeds a predetermined number, when the temperature within the apparatus rises to a set temperature or more, when a shock sensor mounted to the inside of the apparatus detects a shock of a predetermined value or more and when a command for execution of a diagnosis process is input.

Preferably, the light beam emitted from the light source is a ring-shaped light beam consisting of a central first light beam and a second light beam formed around the first light beam, the first light beam is information light associated with page data to be written into the holographic recording medium, the second light beam is reference light for reading out page data recorded on the holographic recording medium, and the information light and the reference light are both incident on the spatial modulating part.

In the present invention, the diagnosis part, the comparing part, the defect detecting part and the component adjusting part may be realized in general by a microcomputer constituted by a CPU, a ROM, a RAM, an I/O controller, a timer and the like. Further, the CPU realizes the functions of the respective parts by causing hardware to operate on the basis of control programs stored in the ROM and the like. A nonvolatile memory such as a ROM, a flash memory or a hard disk is employed as the storing part in order to store known information.

A display device such as an LCD or EL, a printer or a speaker may be employed as the result outputting part.

Hereinafter, embodiments of the present invention will be described using the drawings. However, the present invention is not restricted by the following description of the embodiments.

Structures of Recording and Reproducing Apparatuses

A recording and reproducing apparatus according to the present invention has a self-diagnostic function and, also, has a function of diagnosing recording system and reproducing system optical components of the apparatus, without interposing a holographic recording medium or by providing a reflective surface or the like on the surface of a medium.

The recording system optical components include a group of lenses (5-1, 5-2) and a spatial optical modulator 6, out of the components of the apparatus which will be described later in FIG. 11 and the like, while the reproducing system optical components include a group of mirrors (4-1, 4-2, 4-3) and a two-dimensional image pickup device 7.

In addition, a collimator lens 2, beam splitters (3, 8) and an objective lens 9 are common components which are used with both the recording system and the reproducing system.

Hereinafter, there will be described the structures of four types of holographic recording and reproducing apparatuses.

Figure 11:
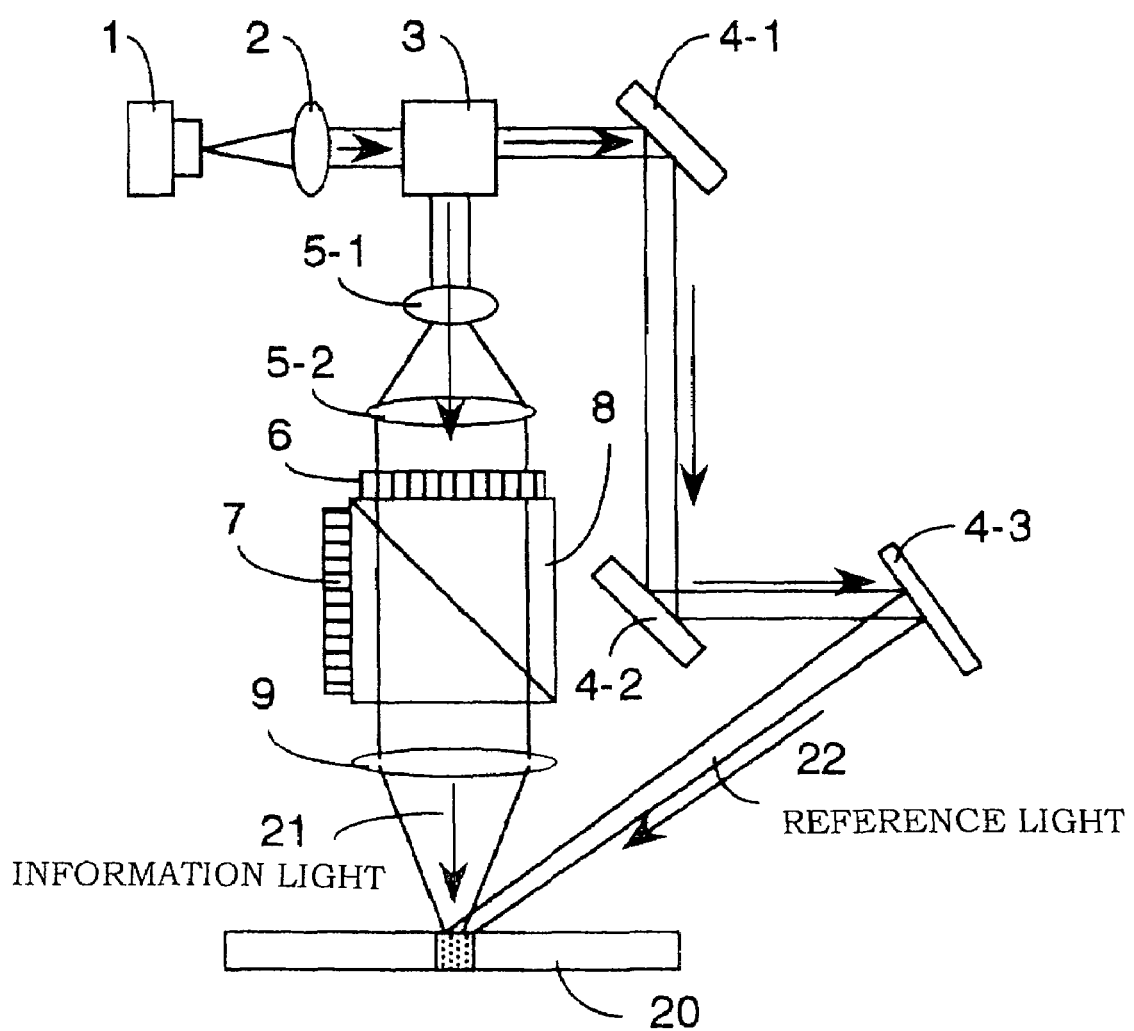
FIG. 11 is a structural diagram of a reflection-type two-beam interference holographic recording and reproducing apparatus during recording, according to the present invention.
Figure 12:
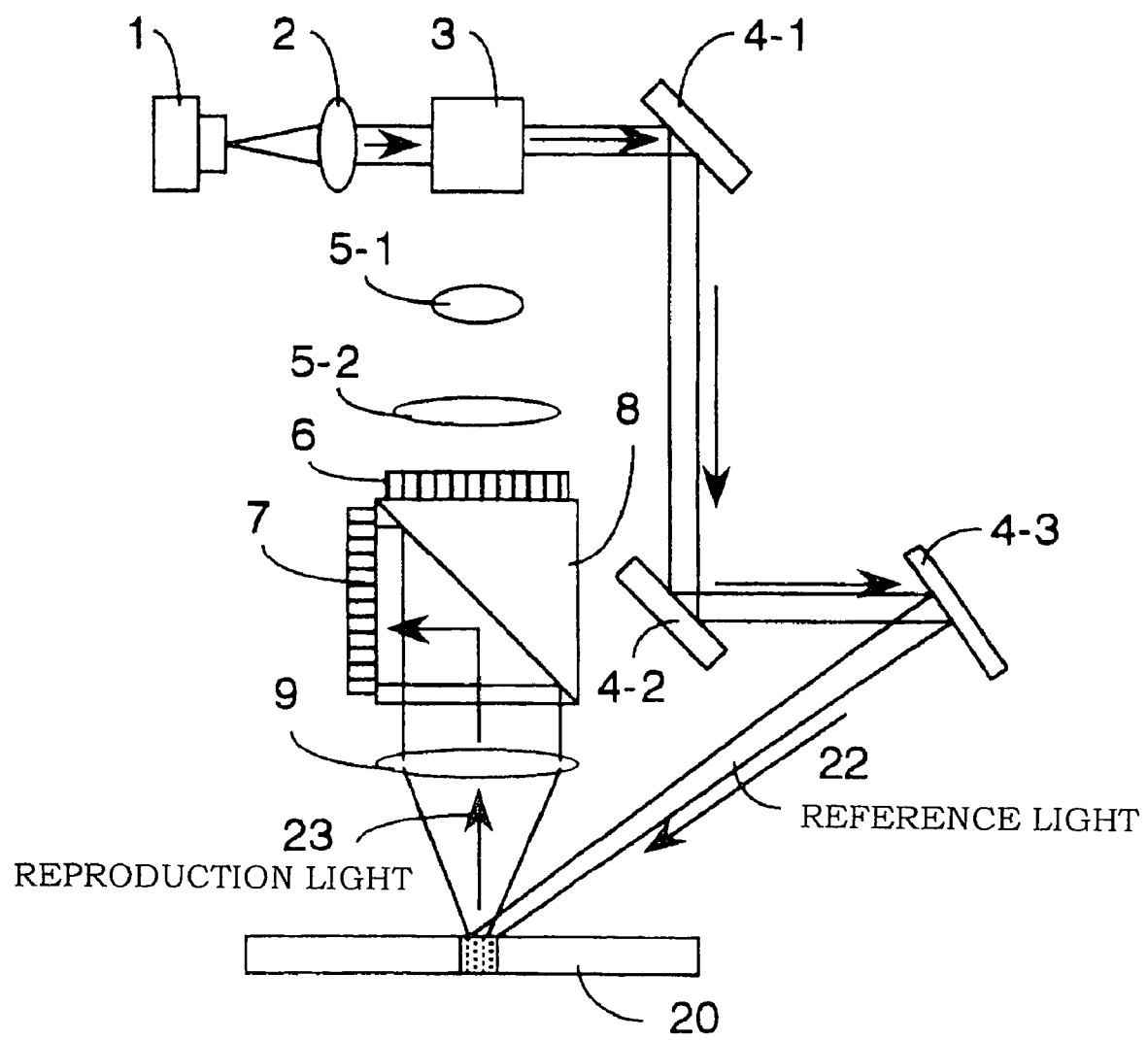
FIG. 12 is a structural diagram of the reflection-type two-beam interference holographic recording and reproducing apparatus during reproducing, according to the present invention.

FIGS. 11 and 12 illustrate schematic structural diagrams of an embodiment of a reflection-type two-beam interference holographic recording and reproducing apparatus.

FIG. 11 illustrates an optical path for recording information on a holographic recording medium 20. A light beam emitted from a light source 1 is passed through the collimator lens 2 and then is split into two kinds of light by the beam splitter 3. One of them is information light 21 which is passed through the group of lenses (5-1, 5-2), the spatial optical modulator 6, the beam splitter 8 and the objective lens 9 and then is directed to the medium 20.

The other one is reference light 22 which is reflected by the group of mirrors (4-1, 4-2, 4-3) and directed to the medium 20 at a predetermined angle. These two kinds of light (information light 21 and reference light 22) are directed to the same position of the medium 20 to record information as interference fringes of light.

The information light 21 is light associated with page data to be written into the medium while the reference light 22 is light for reading out page data recorded on the medium.

FIG. 12 illustrates an optical path for reproducing information from the holographic recording medium 20. During reproduction, only the reference light 22 is used. Namely, only the light from the beam splitter 3 toward the group of mirrors (4-1, 4-2, 4-3) is used, while the light toward the group of lenses (5-1, 5-2) is intercepted. When the reference light 22 is directed to the medium 20, reproduction light 23 is created and the reproduction light 23 is passed through the objective lens 9 and the beam splitter 8 and then is detected by the two-dimensional image pickup device 7.

Figure 13:
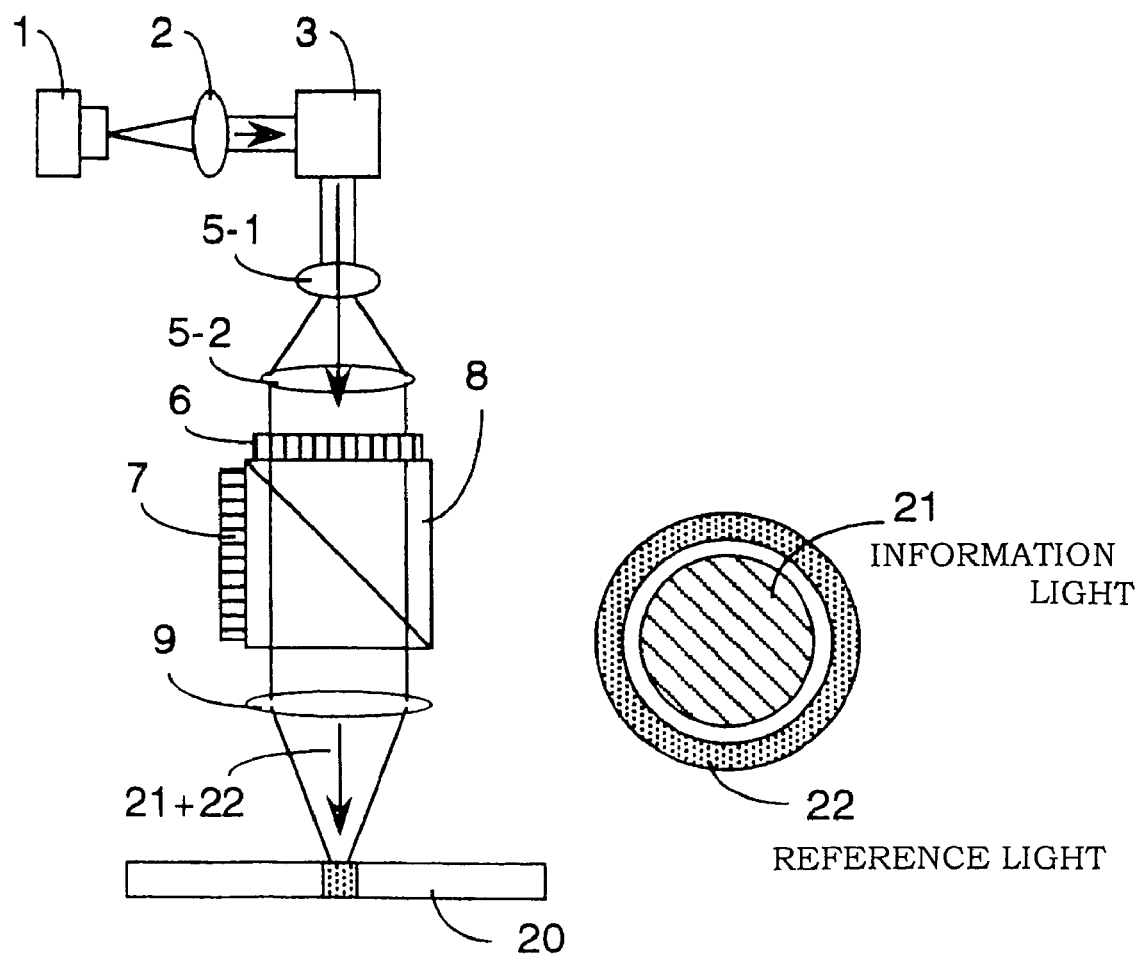
FIG. 13 is a structural diagram of a reflection-type collinear holographic recording and reproducing apparatus during recording, according to the present invention.
Figure 14:
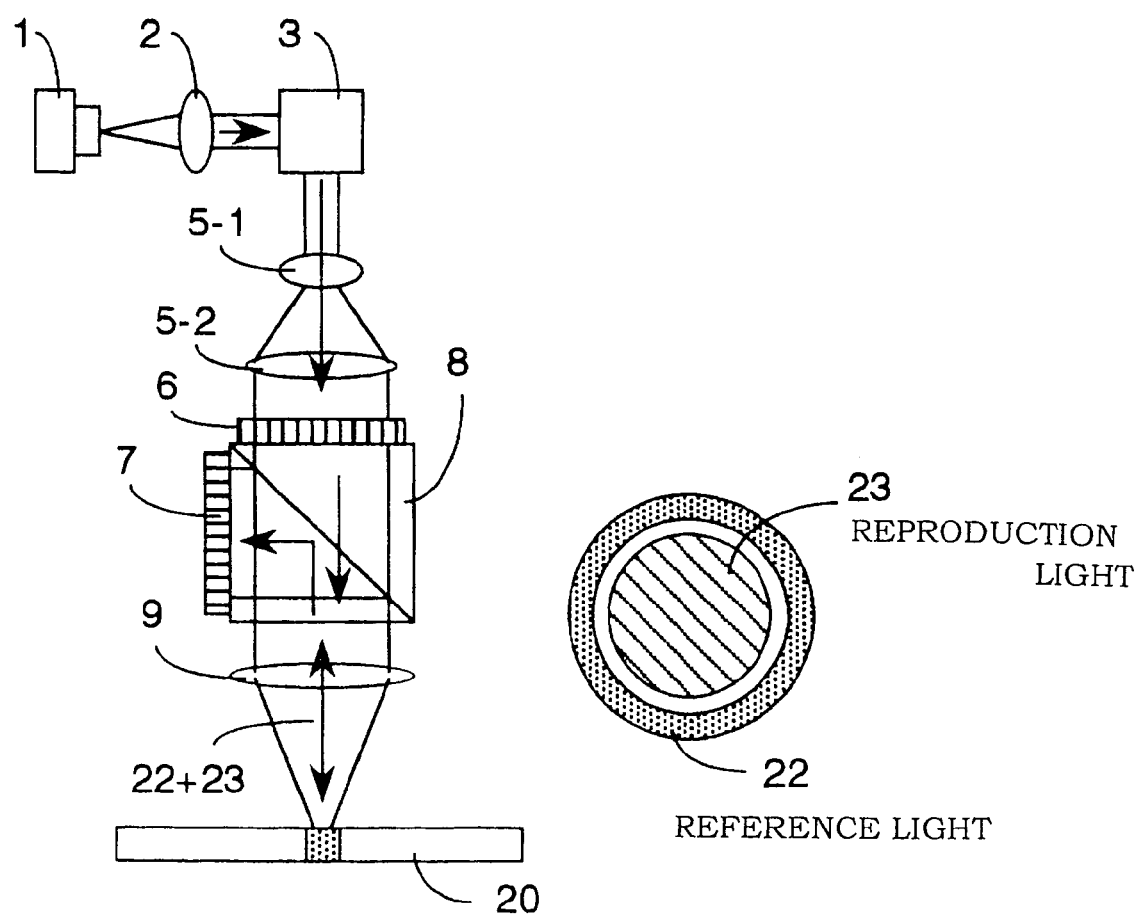
FIG. 14 is a structural diagram of the reflection-type collinear holographic recording and reproducing apparatus during reproducing, according to the present invention.

FIGS. 13 and 14 illustrate schematic structural diagrams of an embodiment of a reflection-type collinear holographic recording and reproducing apparatus.

FIG. 13 illustrates an optical path for recording, while FIG. 14 illustrates an optical path for reproduction. In this case, similarly, a light beam emitted from the light source 1 is passed through the collimator lens 2, the beam splitter 3, the group of lenses (5-1, 5-2) and then is directed to the spatial optical modulator 6. The light beam is comprised of two ring-shaped light beams. As illustrated in FIG. 13, the central light beam corresponds to the information light 21 while the light beam created around the information light 21 corresponds to the reference light 22. Consequently, the group of mirrors (4-1, 4-2, 4-3) as illustrated in FIG. 11 is unnecessary.

During recording in FIG. 13, the light beam comprised of the ring-shaped light beams is passed through the spatial optical modulator 6, the beam splitter 8 and the objective lens 9 to create interference fringes at a predetermined position on the medium 20; thus, information is recorded.

During reproduction illustrated in FIG. 14, only the outer ring-shaped reference light is directed. The reference light 22 is passed through the spatial optical modulator 6, the beam splitter 8 and the objective lens 9 and then is directed to the medium 20; thus, reproduction light 23 is created. The reproduction light 23 is created as light at the central portion of the ring and is passed through the objective lens 9 and the beam splitter 8 and then is detected by the two-dimensional image pickup device 7.

Figure 15:
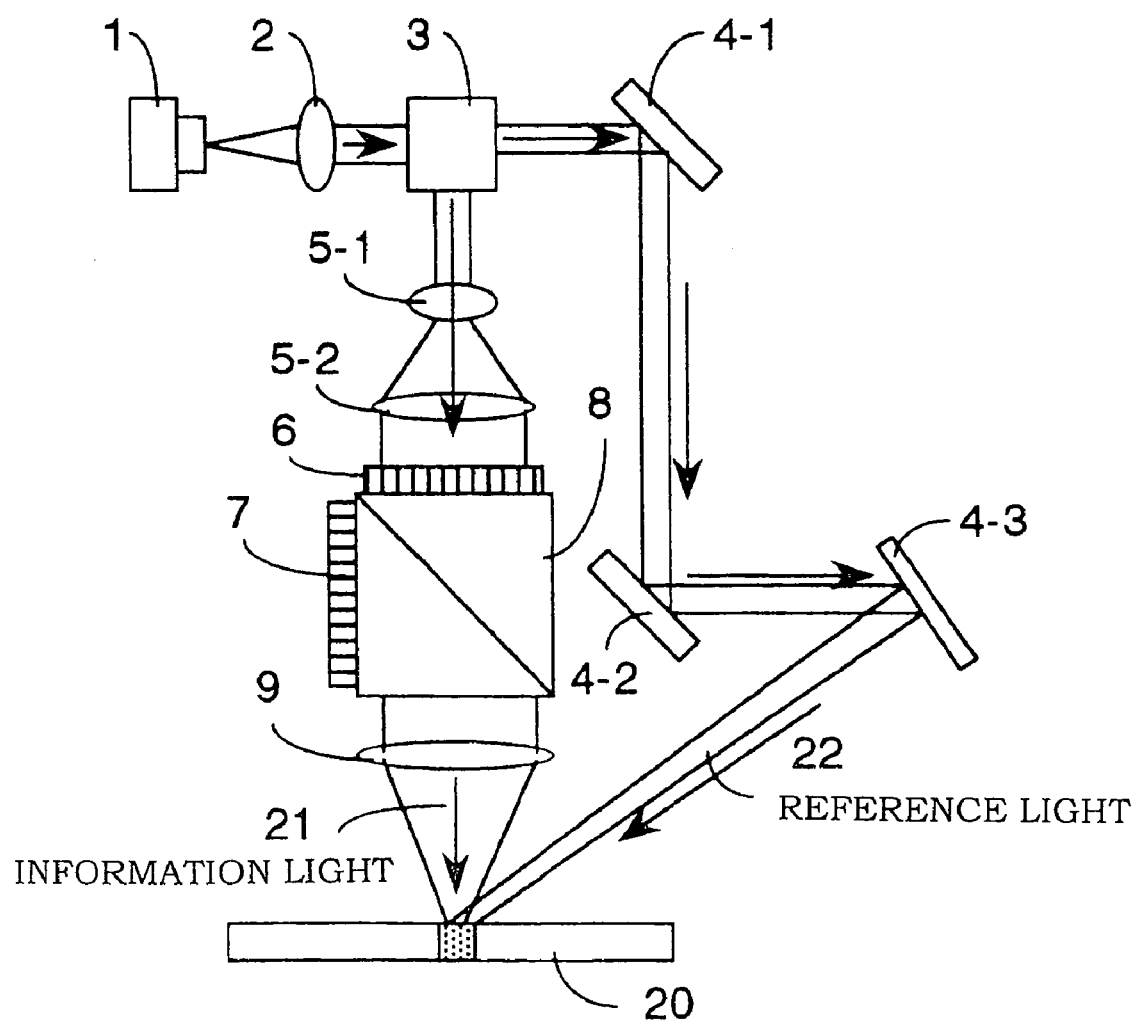
FIG. 15 is a structural diagram of a transparent-type two-beam interference holographic recording and reproducing apparatus during recording, according to the present invention.
Figure 16:
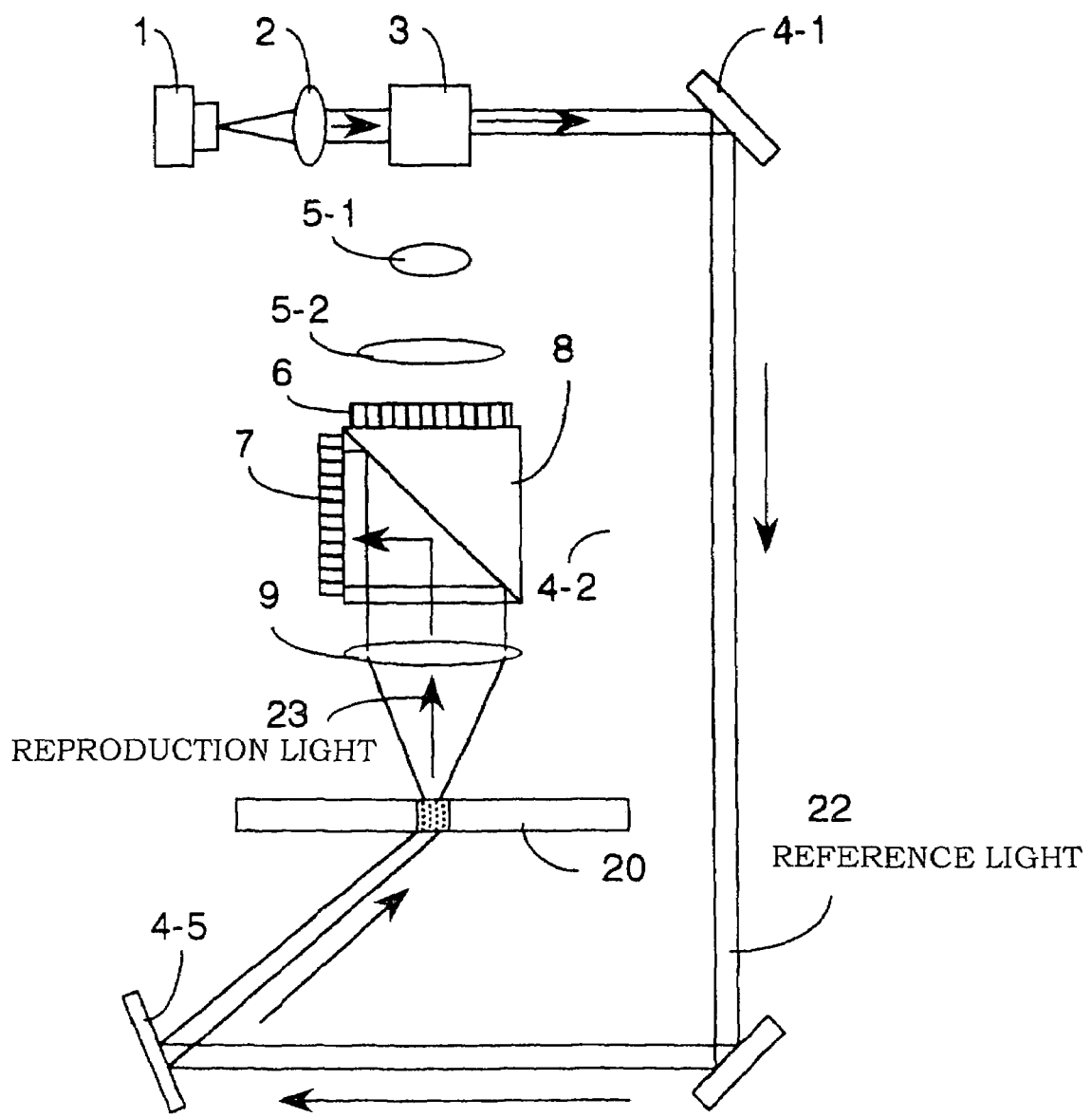
FIG. 16 is a structural diagram of the transparent-type two-beam interference holographic recording and reproducing apparatus during reproducing, according to the present invention.

FIGS. 15 and 16 illustrate schematic structural diagrams of an embodiment of a transmission-type two-beam interference holographic recording and reproducing apparatus.

FIG. 15 illustrates an optical path for recording, while FIG. 16 illustrates an optical path for reproduction. The optical path for recording illustrated in FIG. 15 is the same as that illustrated in FIG. 11. In this case, the medium 20 is a medium configured to include no reflection layer and to enable directing light from thereunder.

During reproduction illustrated in FIG. 16, the reference light 22 is reflected by the mirrors (4-1, 4-4, 4-5) and is directed to the medium 20 from thereunder at a predetermined angle. When the reference light 22 is directed to the medium 20, upwardly-proceeding reproduction light 23 is created. The created reproduction light 23 is passed through the objective lens 9 and the beam splitter 8 and is detected by the two-dimensional image pickup device 7.

Figure 17:
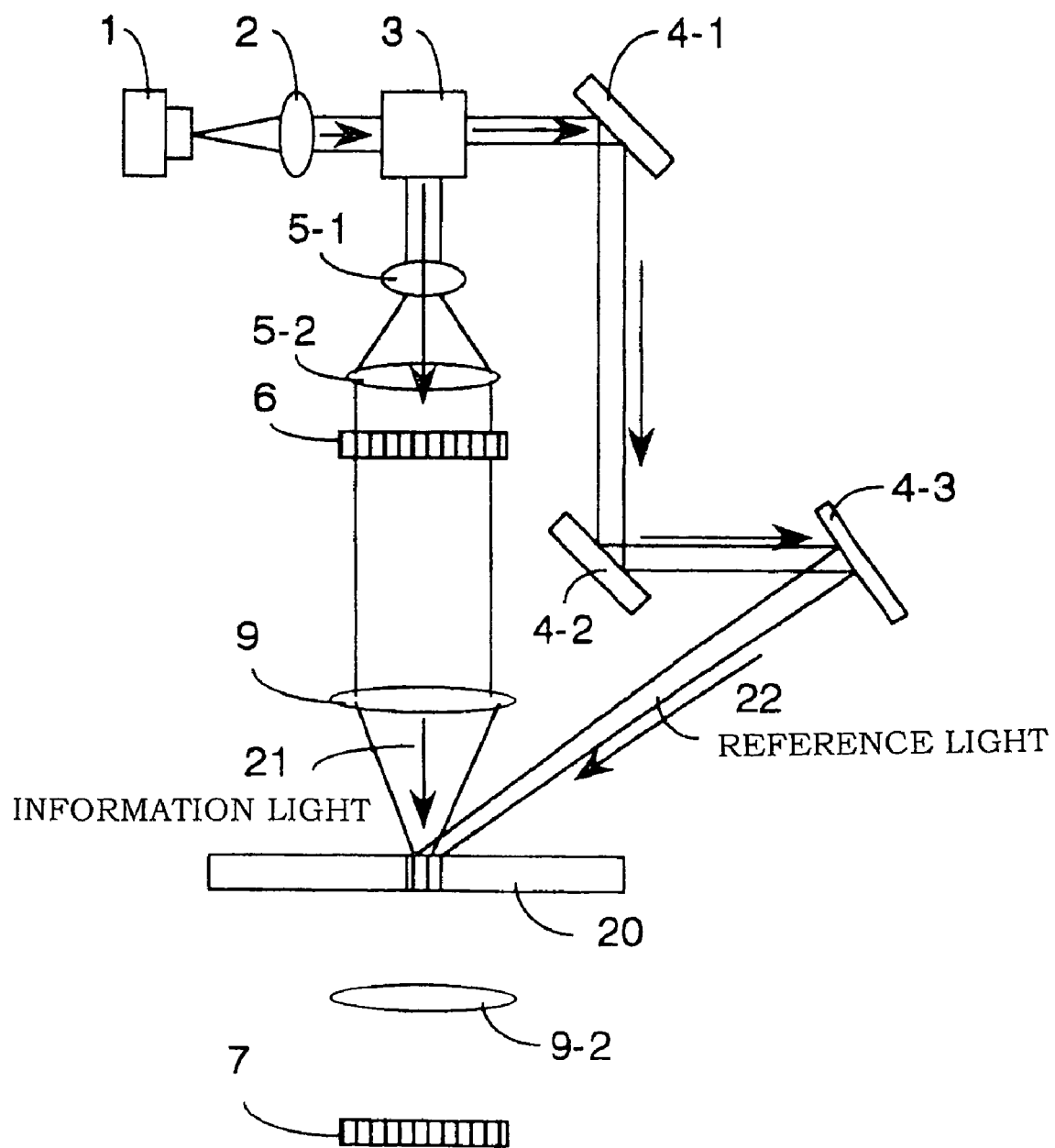
FIG. 17 is a structural diagram of the transparent-type two-beam interference holographic recording and reproducing apparatus during recording, according to the present invention.
Figure 18:
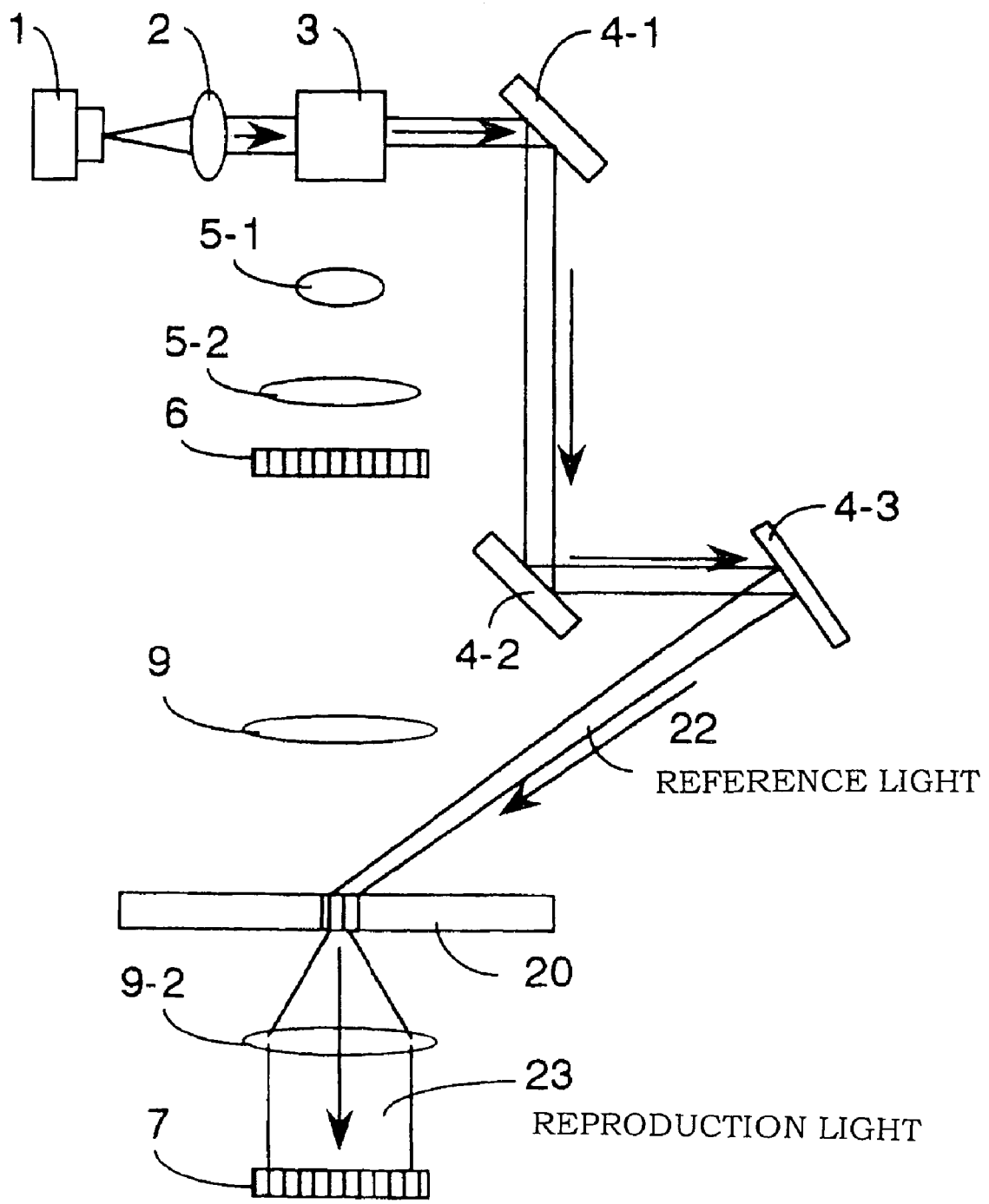
FIG. 18 is a structural diagram of the transparent-type two-beam interference holographic recording and reproducing apparatus during reproducing, according to the present invention.

FIGS. 17 and 18 illustrate schematic structural diagrams of an embodiment of a transmission-type two-beam interference holographic recording and reproducing apparatus.

In this case, unlike in FIGS. 11 and 15, the beam splitter 8 is not utilized and the two-dimensional image pickup device 7 and an objective lens 9-2 are provided at the opposite side of the medium 20 from the objective lens 9 and the like, namely, under the medium 20.

FIG. 17 illustrates an optical path for recording, while FIG. 18 illustrates an optical path for reproduction.

The optical paths for the information light 21 and the reference light 22 during recording illustrated in FIG. 17 are the same as those illustrated in FIG. 11. In this case, similarly to the medium used in FIG. 15, a medium capable of being irradiated with light from thereunder is employed.

During reproduction illustrated in FIG. 18, the reference light 22 is directed to the medium 20 through the group of mirrors (4-1, 4-2, 4-3). When the reference light 22 is directed to the medium 20, reproduction light 23 is created and then is emitted from the surface thereof opposite from the surface irradiated with the reference light. Then, the reproduction light 23 is passed through the objective lens 9-2 and is detected by the two-dimensional image pickup device 7.

Hereinbefore, the structures of four types of recording and reproducing apparatuses and the optical paths for recording and reproducing therein have been described.

Next, there will be described structures and optical paths for executing self-diagnosis.

The structures for diagnosis illustrated in the following first, second, third and fourth embodiments are applicable to any of the three recording and reproducing apparatuses illustrated in FIGS. 11, 13 and 15.

First Embodiment of Self-Diagnosis

FIG. 1 illustrates an explanatory diagram of the structure of self-diagnosis according to the first embodiment of the present invention.

The self-diagnosis illustrated in FIG. 1 employs the light source 1, the collimator lens 2, the beam splitter 3, the group of lenses (5-1, 5-2), the spatial optical modulator 6, the beam splitter 8 and the two-dimensional image pickup device 7. The objective lens 9 and the medium 20 are not used.

The placement of the beam splitter 8 is different from that illustrated in FIG. 11. Namely, it is rotationally and leftwardly displaced by 90° from the placement of the beam splitter 8 in FIG. 11 and, as illustrated in FIG. 1, a light beam incident to the beam splitter 8 is reflected leftwardly and is directed to the two-dimensional image pickup device 7.

In the first embodiment, there is provided a mechanism for rotating the beam splitter 8, and the beam splitter 8 is automatically or manually rotated during self-diagnosis, as illustrated in FIG. 1. The beam splitter 8 corresponds to an optical-path changing part.

In the first embodiment, the light beam is directly incident on the two-dimensional image pickup device 7 from the spatial optical modulator 6 through only the beam splitter 8 without interposing a medium therebetween; therefore, it is possible to detect whether or not there is a defect on the path from the spatial optical modulator 6 to the two-dimensional image pickup device 7.

The defect detection process during diagnosis may be executed as follows, for example.

Known page data D1 prestored in a memory is provided to the spatial optical modulator 6 and the same operation as the normal recording process is performed. Namely, a light beam is emitted from the light source 1 and a light beam corresponding to information light 21 is directed to the spatial optical modulator 6.

When the beam splitter 8 is placed as in FIG. 1, the path of the information light 21 is leftwardly turned; thus, the information light 21 is detected by the two-dimensional image pickup device 7. Two-dimensional page data D2 which corresponds to the detected information light is extracted as digital signals and the two-dimensional page data D2 is compared with the known page data D1 stored in the memory.

If the both types of page data (D1, D2) are completely in agreement with each other, it is proven that there is no defect in the components (6, 7, 8) along the path from the spatial optical modulator 6 to the two-dimensional image pickup device 7.

On the other hand, if the both types of page data have portions which are not in agreement with each other, then it is proven that there is a defect in the path from the spatial optical modulator 6 to the two-dimensional image pickup device 7.

In the first embodiment illustrated in FIG. 1, it is possible to detect defects in at least any of the spatial optical modulator 6, the beam splitter 8 and the two-dimensional image pickup device 7, even though the causes of the defects can not be certainly identified. If a defect is detected, adjustments or correction processes as will be described later may be performed to eliminate the defect of the apparatus, which may enable normal recording and reproducing.

Further, if it is not possible to perform adjustments or the like or it is not possible to perform normal operations even after adjustments, the occurrence of error, the content of error, possible causes of the error or the necessity of repairs can be displayed or announced with respect to a user. This can enable the user to address them, thus preventing waste of the medium or time.

In the first embodiment, it is necessary to rotate the beam splitter 8, and there may be provided a mechanism such as a self-diagnosis switch so that the self-diagnosis is executed when a user has pushed the switch. In this case, the user can easily start the self-diagnosis only by pushing the switch, which enables detection of defects without exerting a burden on the user. The timing of staring the self-diagnosis may be varied as will be described later and is not limited to that described above.

Second Embodiment of Self-Diagnosis

Figure 2:
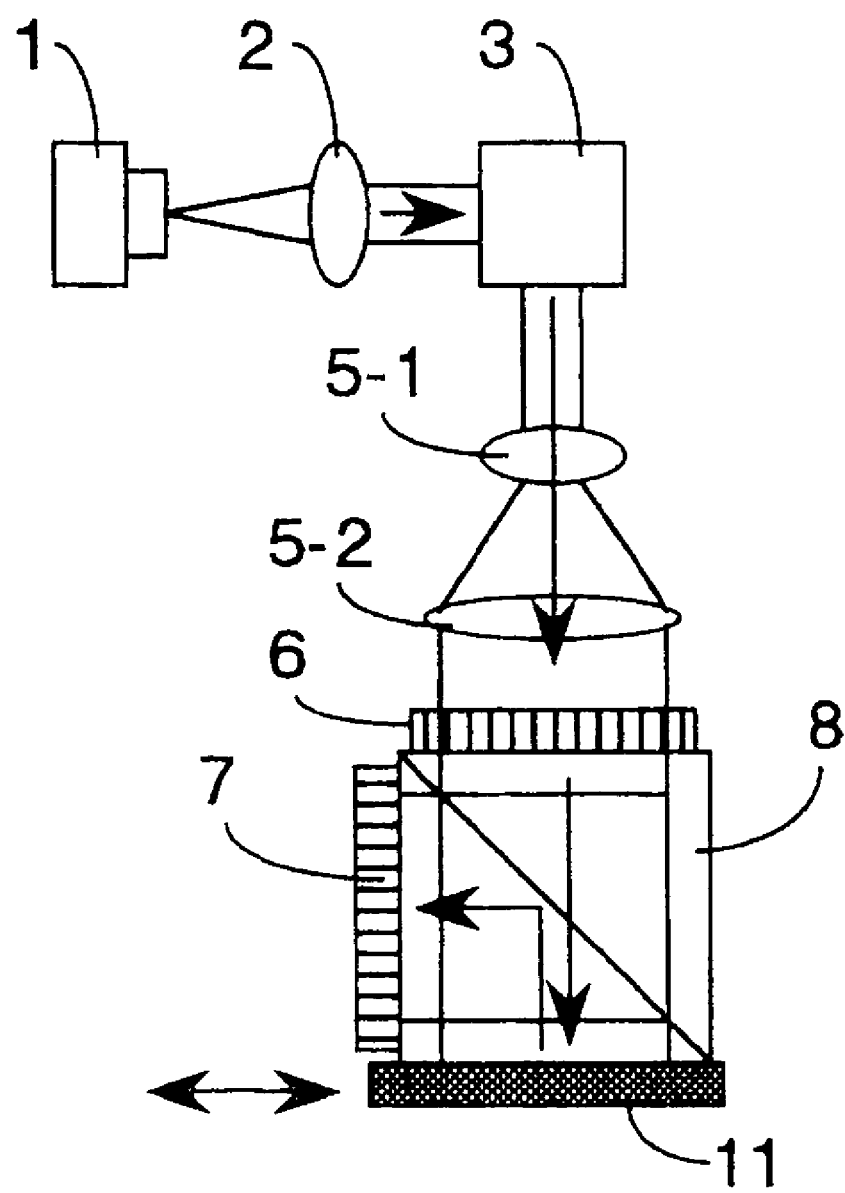
FIG. 2 is an explanatory diagram of a structure of a recording and reproducing apparatus during self-diagnosis according to a second embodiment of the present invention.

FIG. 2 illustrates an explanatory diagram of the structure according to the second embodiment of the present invention.

In FIG. 2, there is provided a mirror 11 for reflecting information light 21 emitted from the beam splitter 8. In the second embodiment, similarly, no medium is used for self-diagnosis. The beam splitter 8 and the mirror correspond to an optical-path changing part.

The mirror 11 is inserted into the optical path for information light between the beam splitter 8 and the objective lens 9 at the start of self-diagnosis while it is removed from the optical path for information light during normal recording and reproducing. Information light 21 is totally reflected by the mirror 11 and is returned back to the inside of the beam splitter 8. The returned light beam is reflected leftwardly toward the two-dimensional image pickup device 7. Therefore, it is preferable to employ a movable-type mirror and the mirror may be inserted to a position adjacent to the beam splitter as illustrated in FIG. 2.

In FIG. 2, it is unnecessary that the beam splitter 8 is rotated and it may be fixed.

In the second embodiment, it is possible to detect defects in the optical path from the spatial optical modulator 6 to the two-dimensional image pickup device 7, wherein the mirror 11 is included in the optical path.

The defect detection process can be executed similarly to that described in the first embodiment. In the second embodiment, for example, when a self-diagnosis switch has been pushed, the mirror 11 may be moved and inserted under the beam splitter 8 as illustrated in FIG. 2 and then detection of defects may be performed. Thus, it is possible to execute self-diagnosis without exerting a burden on the user.

Also, instead of the mirror 11, a liquid-crystal shutter may be provided at a portion under the beam splitter 8 which corresponds to the region to which reference light is directed. The shutter is opened to pass information light or reproduction light therethrough during recording and reproducing, while it is closed to totally reflect information light during self-diagnosis. In this case, there is a need for opening/closing control of the liquid crystal shutter and such control may be realized by electrical signals from a microcomputer. Therefore, there is no need for providing a mechanism such as one for moving the mirror 11.

Third Embodiment of Self-Diagnosis

Figure 3:
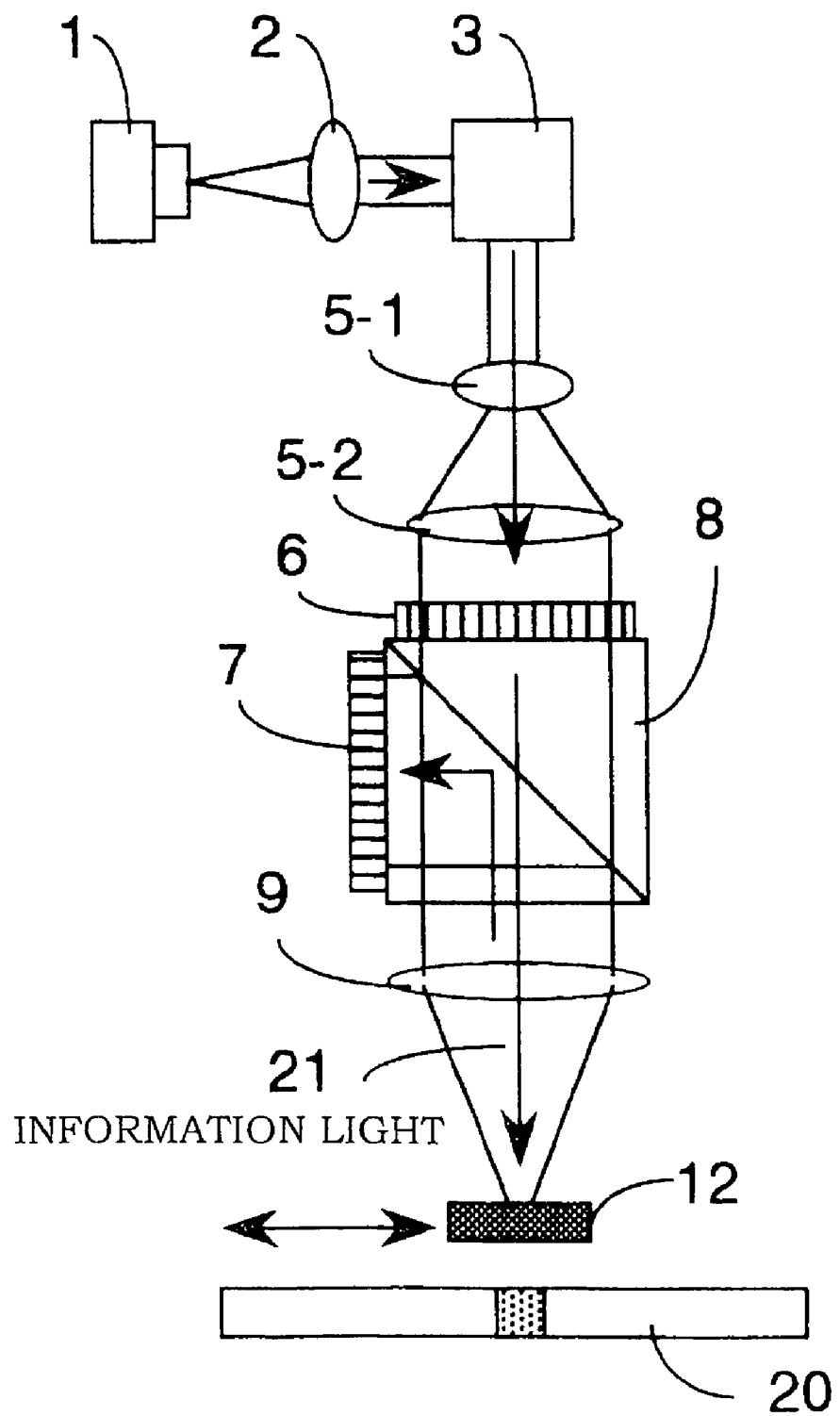
FIG. 3 is an explanatory diagram of a structure of a recording and reproducing apparatus during self-diagnosis according to a third embodiment of the present invention.

FIG. 3 illustrates an explanatory diagram of the structure according to the third embodiment according to the present invention.

In FIG. 3, a mirror 12 is provided within the space between the objective lens 9 and the medium 20 on the optical path for information light. In the third embodiment, similarly, no medium is used during self-diagnosis.

The mirror 12 is inserted into the optical path for information light illustrated in FIG. 3 at the start of self-diagnosis while it is removed from the optical path for information light during normal recording and reproducing. Therefore, the mirror 12 is a movable mirror and there is provided a mechanism for moving it. The movable mirror 12 corresponds to an optical-path changing part.

In the third embodiment, a light beam emitted from the light source proceeds toward the spatial optical modulator 6, the beam splitter 8, the objective lens 9 and the mirror 12, then is totally reflected by the mirror 12. After totally reflected by the mirror 12, the light beam is passed through the objective lens 9 and the beam splitter 8 and then is detected by the two-dimensional image pickup device 7.

Although the mirror 12 may be inserted to any position between the objective lens 9 and the medium 20, it is preferable that the mirror 12 is inserted to a position near the medium 20 as illustrated in FIG. 3, in view of adjustment of the focus point.

In the third embodiment, it is possible to detect defects in the optical components including the mirror 12, the spatial optical modulator 6, the beam splitter 8, the objective lens 9 and the two-dimensional image pickup device 7. Namely, unlike the first and second embodiments, it is possible to detect defects in any of the optical components including even the objective lens 9. The defect detection process can be executed similarly to that described in the second embodiment.

In the third embodiment, similarly, a self-diagnosis switch may be provided to enable the user to easily execute self-diagnosis without bearing a burden.

Also, if the diagnosis according to the first embodiment illustrated in FIG. 1 and the diagnosis according to the third embodiment are individually executed and, as a result, no defect is detected by the diagnosis according to the first embodiment, but a defect is detected by the diagnosis according to the third embodiment, it is proven that there may be a malfunction in the objective lens 9. In the case where there may be a malfunction in the objective lens 9, a focus adjusting process as will be described later may be performed to correct the malfunction of the objective lens 9 to enable normal recording and reproducing.

Fourth Embodiment of Self-Diagnosis

Figure 4:
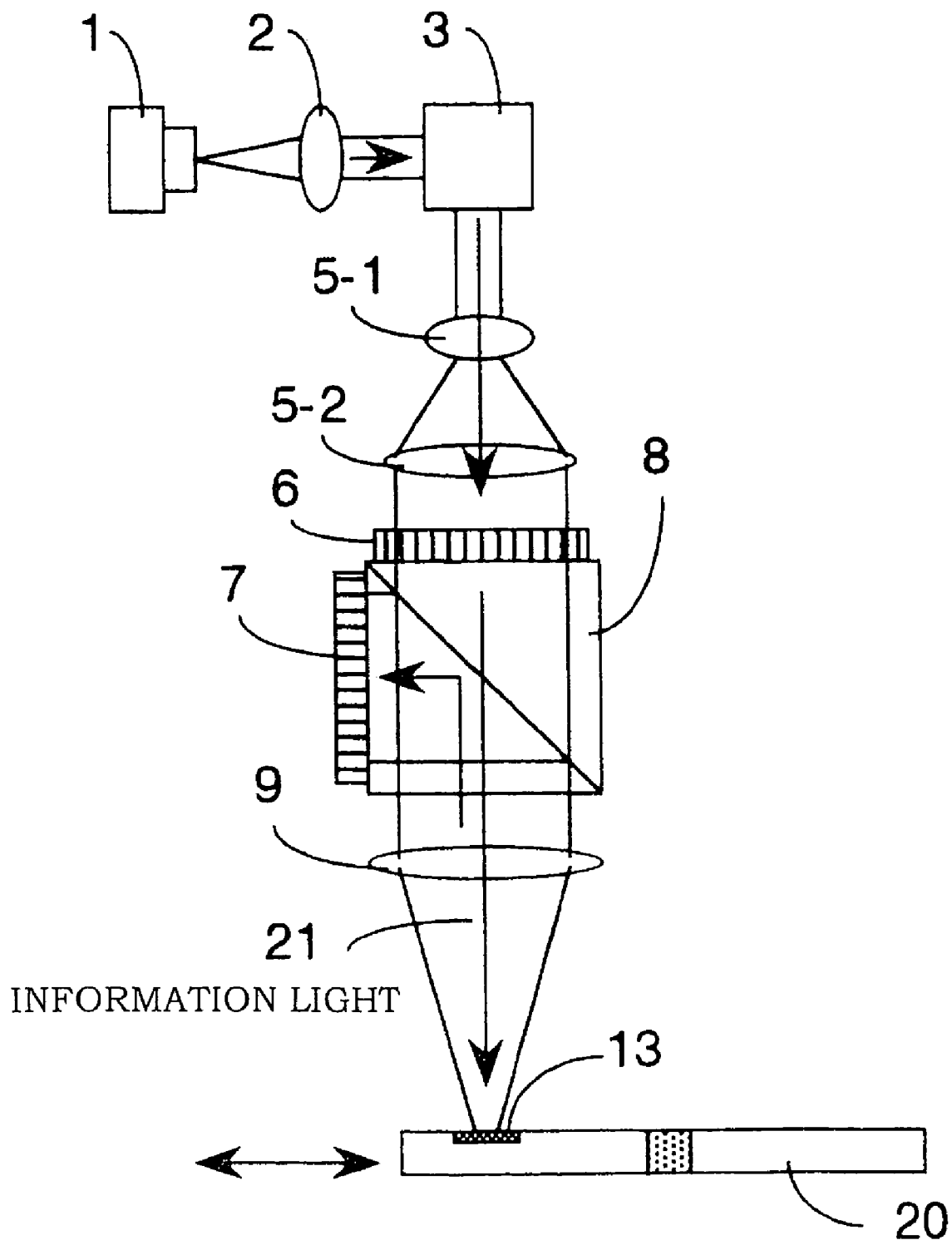
FIG. 4 is an explanatory diagram of a structure of a recording and reproducing apparatus during self-diagnosis according to a fourth embodiment of the present invention.

FIG. 4 illustrates an explanatory diagram of the structure according to the fourth embodiment of the present invention.

The fourth embodiment is characterized in that a diagnosis region 13 is provided at a certain position of a medium. Therefore, in the fourth embodiment, a medium is used for diagnosis and it is possible to check the inclination (tilt) or the like of the medium mounted to the apparatus.

As illustrated in FIGS. 11 and 12, reference light 22 is directed to the medium surface at a predetermined angle and the angle of the reference light is adjusted on the precondition that the mounted medium is positioned in conformity with the design specification. However, if the medium itself is not at the standard position in conformity with the design specification and is slightly inclined relative to the standard position, then the incident angle of the reference light will be different from the desired angle, which may prevent normal recording and reproducing.

Therefore, if a defect is detected in the fourth embodiment on the precondition that no defect is detected by the diagnosis according to the third embodiment, it can be determined that the medium has some problems.

There are some possible causes of problems of the medium and, for example, the inclination of the medium itself as described above is one of the causes. A possible solution thereof is to perform a tilt correction for the medium as will be described later. Namely, in the case where a defect is detected in the fourth embodiment, the apparatus having recording and reproducing problems may be restored to a normal state by performing a tilt correction, in some cases.

In the fourth embodiment, a mirror for totally reflecting incident light is provided at the diagnosis region 13 provided on the medium. The mirror may be provided at any position on the medium surface to be irradiated with light and may be provided at a predetermined position. The size of the mirror is only required to be slightly greater than the spot diameter of the light beam.

In the fourth embodiment, a light beam emitted from the light source is passed through the spatial optical modulator 6, the beam splitter 8 and the objective lens 9 and then is directed to the mirror 13 on the medium. Further, the light beam is totally reflected by the mirror 13, passed through the objective lens 9 and the beam splitter 8 and is detected by the two-dimensional image pickup device 7.

In the fourth embodiment, for example, when a self-diagnosis switch has been pushed, the medium is moved such that the diagnosis region 13 on the medium is at the position to be irradiated with the light beam and then information light 21 is directed thereto. With the fourth embodiment, it is possible to execute self-diagnosis without exerting a burden on the user.

The four embodiments of self-diagnosis have been described and these self-diagnoses can be applied to any of the reflection-type two-beam interference recording and reproducing apparatus of FIG. 11, the reflection-type collinear recording and reproducing apparatus of FIG. 13, and the transmission-type two-beam interference recording and reproducing apparatus of FIG. 15.

The reflection-type collinear recording and reproducing apparatus is different in that the light beam to be directed has a double-ring shape as illustrated in FIG. 13. However, it is also possible to direct only the central information light or a single parallel light beam which is not ring-shaped.

Fifth Embodiment of Self-Diagnosis

Hereinafter, there will be described self-diagnosis of the transmission-type two-beam interference holographic recording and reproducing apparatus illustrated in FIG. 17.

This apparatus is different in the placement of the two-dimensional image pickup device 7 from the other apparatuses and thus is different in the optical path for self-diagnosis.

Figure 5:
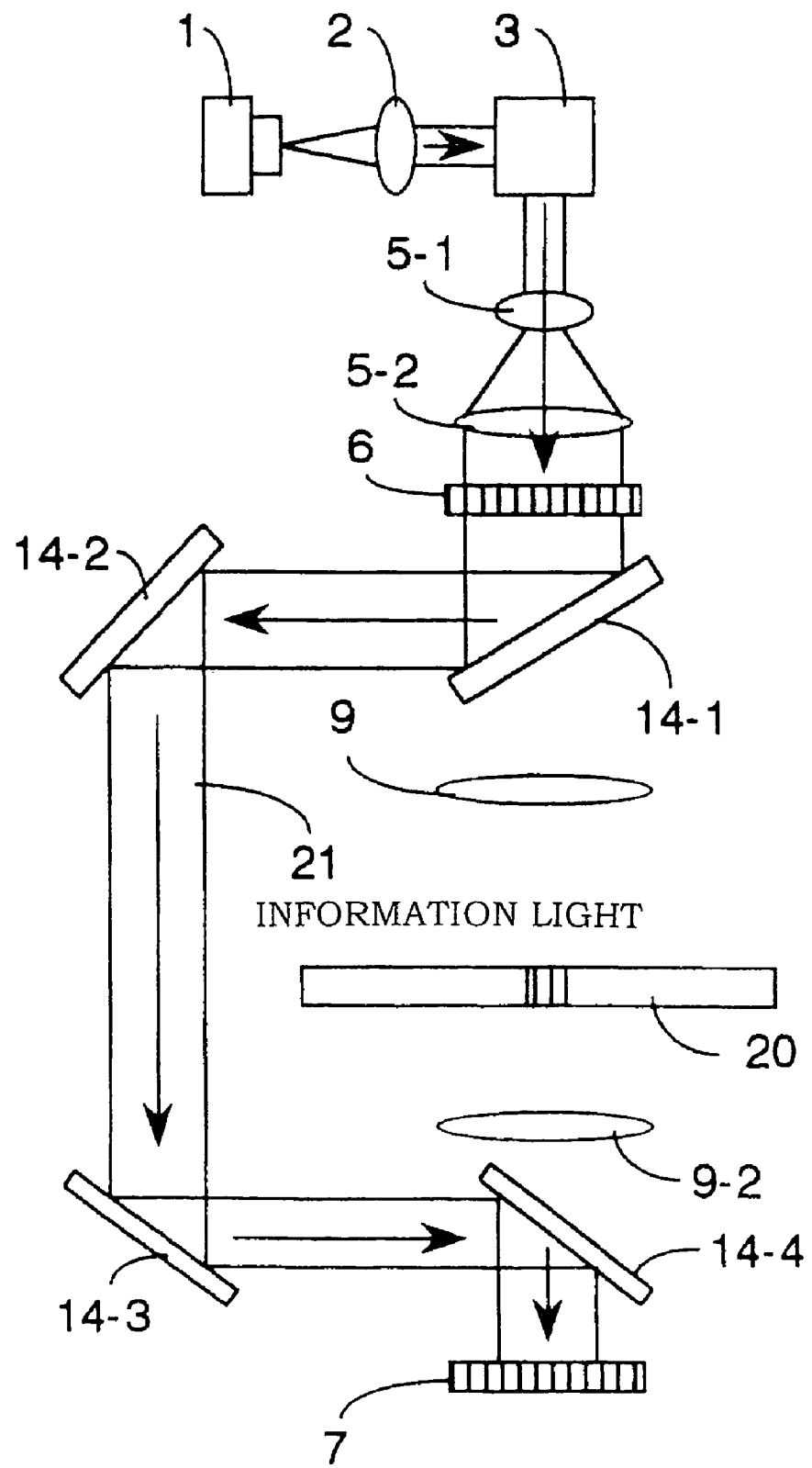
FIG. 5 is an explanatory diagram of a structure of a recording and reproducing apparatus during self-diagnosis according to a fifth embodiment of the present invention.
Figure 6:
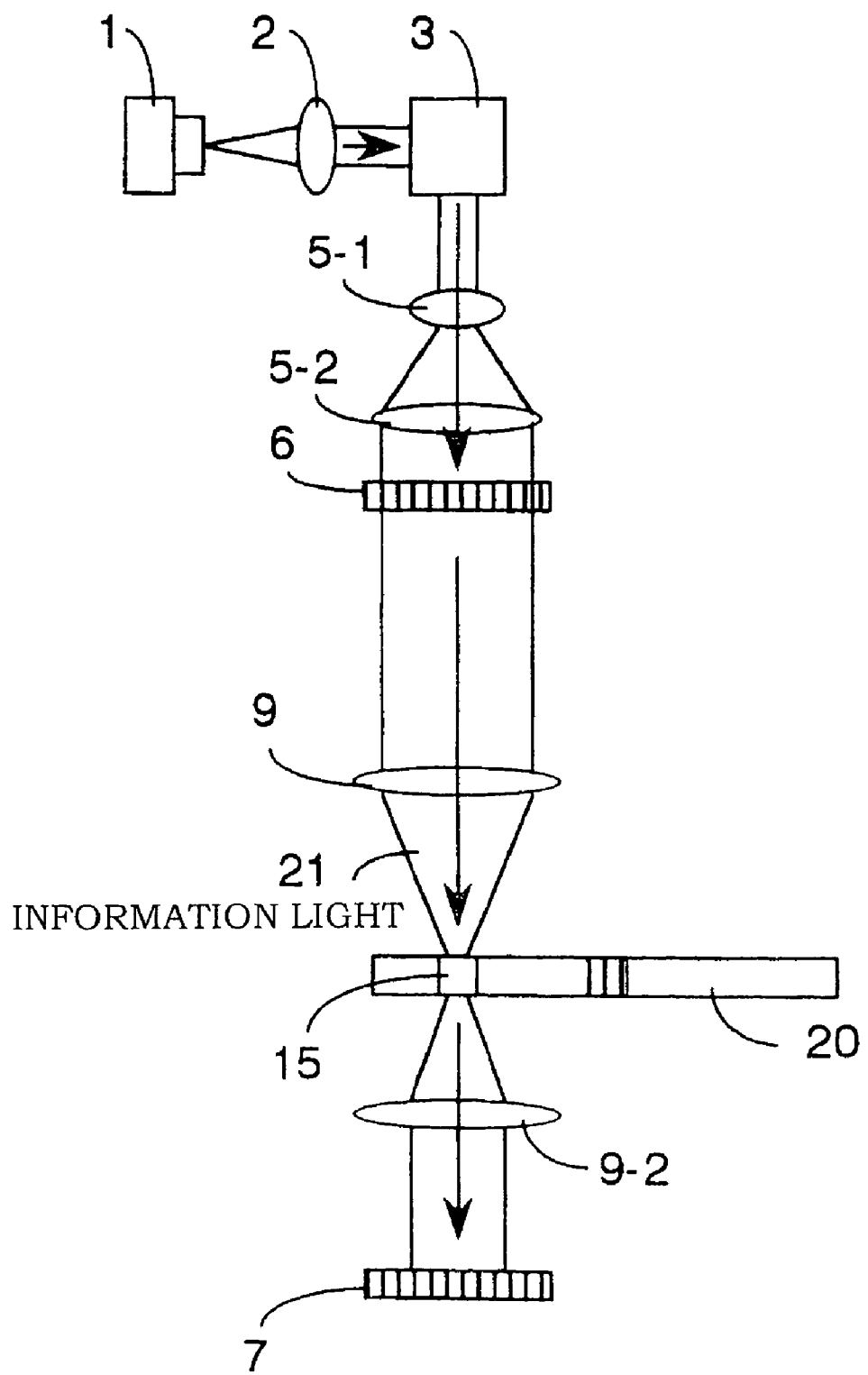
FIG. 6 is an explanatory diagram of the structure of the recording and reproducing apparatus during self-diagnosis according to the fifth embodiment of the present invention.

FIGS. 5 and 6 illustrate explanatory diagrams of the structure of an embodiment of self-diagnosis according to the fifth embodiment of the present invention.

FIG. 5 illustrates an optical path for self-diagnosis using no medium 20.

Here, a group of movable mirrors (14-1, 14-2, 14-3, 14-4) is provided such that a light beam passed through the spatial optical modulator 6 bypasses the medium 20 and is detected by the two-dimensional image pickup device 7. The number of the movable mirrors 14 is not limited to four and the placement thereof is not limited to that described above. The movable mirrors correspond to an optical-path changing part.

The movable mirrors 14 are moved to a different position during normal recording and reproducing while they are placed as in FIG. 5 during self-diagnosis. Also, when the placement of the movable mirrors does not obstruct normal recording and reproducing, three mirrors (14-2, 14-3, 14-4) may be fixedly placed and only the movable mirror 14-1 may be made movable.

The self-diagnosis illustrated in FIG. 5 may be activated when the user has pushed a self-diagnosis switch, which enables detection of defects between the spatial optical modulator 6 and the two-dimensional image pickup device 7 without exerting a burden on the user.

However, when the holographic recording medium is portable and thus is easily detachable and also the spatial optical modulator 6 and the two-dimensional image pickup device 7 are straightly positioned so that a light beam passed through the spatial optical modulator 6 may be directly directed to the two-dimensional image pickup device 7, the group of mirrors (14-1 to 14-4) is unnecessary.

FIG. 6 illustrates an optical path for self-diagnosis using a medium 20.

In this case, a region for passing light therethrough (transparent region 15) is provided at a certain position of the medium 20. The transparent region 15 may be formed from glass or transparent resin extending from the surface of the medium to the back surface thereof.

Light passed through the transparent region 15 is passed through the objective lens 9-2 and then is directed to the two-dimensional image pickup device 7. Although in this structure it is necessary that a transparent region is provided in the medium and that the medium is moved such that information light is directed to this transparent region during self-diagnosis, this structure enables self-diagnosis when the medium is not detachable. Further, the group of mirrors 14 is unnecessary, thus preventing increases of the number of components.

In FIG. 6, it is possible to easily detect defects in any of the optical components (including the objective lenses 9, 9-2) existing along the path from the spatial optical modulator 6 to the two-dimensional image pickup device 7, without exerting a burden on the user.

Timing of Self-Diagnosis

The self-diagnoses described in the aforementioned embodiments may be started with various timings, as well as when the user has pushed a self-diagnosis switch.

For example, they can be started with the following timings:

(1) when it is detected that the power of the recording and reproducing apparatus according to the present invention has been turned on, (2) when it is detected that a portable medium has been inserted into the apparatus, (3) before the execution of recording or reproducing operations after a recording request or a reproducing request is detected, (4) every time a constant time interval has elapsed during the idle state where the apparatus does not perform the recording and reproducing operations, (5) the number of times that a failure of the recording and reproducing operations (recording error or reproducing error) is detected has exceeded a predetermined number, (6) when the ambient temperature within the apparatus rises to above a set temperature, and (7) a shock sensor mounted to the inside of the apparatus detects a shock of a predetermined value or more.

The timing of starting self-diagnosis is not limited to the aforementioned timings and, by selecting some of these timings, it is possible to rapidly and certainly detect defects, although it is unnecessary to select all of these timings.

Further, if a defect is detected as a result of executing the defect detection process with various timings, the fact of the existence of a defect is displayed. Also, preferably, when the defective component or the defective position can be identified to some degree, display or sound announcement of the fact is given to the user on a case-by-case basis. This can prevent waste of the medium or time which would occur if the apparatus was continuously used thereafter under the existence of defects.

Further, in order to measure the ambient temperature, a temperature sensor can be mounted to the inside of the apparatus. The position of the temperature sensor is not particularly limited and, for example, it may be mounted near a portion which will be subjected to a highest temperature within the apparatus.

Also, the position of the shock sensor is not particularly limited.

Defect Detection and Subsequent Addressing Processes

Hereinafter, there will be described the execution of adjustments of the recording and reproducing components of the apparatus and correction processes when a defect has been detected by executing self-diagnosis.

Possible adjustment processes include adjustments of the focus of the objective lens 9, adjustments of the tilt of the medium 20 and the replacement process in the case where there are defects in the spatial optical modulator 6 and the two-dimensional image pickup device 7.

FIG. 7 illustrates a flowchart of an example of the defect detection process and the adjustment process according to the present invention. Here, it is assumed that the following three types of self-diagnoses are executed, out of the aforementioned embodiments of self-diagnoses.

Type 1: the self-diagnosis according to the first embodiment (FIG. 1) (without interposition of an medium and an objective lens).

Type 2: the self-diagnosis according to the third embodiment (FIG. 3) (diagnosis including an objective lens without interposition of an medium).

Type 3: the self-diagnosis according to the fourth embodiment (FIG. 4) (diagnosis including a medium).

According to type 1, light passed through the spatial optical modulator 6 is passed through the beam splitter 8 and then is directed to the two-dimensional image pickup device 7. In this case, if there is no defect in the beam splitter 8, it is possible to detect defects in any of the spatial optical modulator 6 and the two-dimensional image pickup device 7.

Further, the self-diagnosis according to the second embodiment (FIG. 2) may be employed in type 1.

According to type 2, light is passed through the objective lens 9, reflected by the mirror 12 and then directed to the two-dimensional image pickup device 7. Therefore, if no defect is detected in type 1, but a defect is detected by type 2, it is proven that the objective lens 9 may have some malfunctions.

According to type 3, the diagnosis region (mirror) 13 provided in the medium is used for diagnosis. Therefore, if no defect is detected in type 1 and type 2, but a defect is detected by type 3, it is proven that the medium may have some malfunctions.

Thus, by executing combination of the three types of self-diagnoses, it is possible to detect problems in the apparatus and perform adjustments on the basis of the result of detection to restore the apparatus to a normal state.

In the flowchart of FIG. 7, in step S1, the self-diagnosis of type 1 is executed to determine whether or not there is a defect. If it is detected that there is a defect at this time, the process proceeds to step S11 where a replacing process is performed.

If a defect is detected in step S11, it may be determined in some cases that there is a defect in the spatial optical modulator 6 or the two-dimensional image pickup device 7. At this time, a known pattern (page data A) prestored in a memory such as a ROM is compared with an image-pickup pattern (page data B) which is detected by the two-dimensional image pickup device 7 when the self-diagnosis of type 1 is executed by providing the aforementioned known pattern to the spatial optical modulator 6. Then, pixels at which there is disagreement between the image-pickup pattern and the known pattern can be determined to be defective pixels.

Although it can not be determined whether such defective pixels are caused by the spatial optical modulator 6 or the two-dimensional image pickup device 7, data to be written in the positions of the defective pixels can be moved to a pre-provided replacement region, thus enabling normal recording and reproducing similarly to when there is no defect.

As the known pattern (page data) to be used, several types of page data such as an all-black pattern, an all-white pattern, and a white/black reversed pattern may be prestored in a memory and the self-diagnosis processes may be executed by using one or plural patterns as necessary.

Further, the replacement region is a partial region in spatial information (data pattern) to be provided to the spatial optical modulator. When there is no defect, the replacement region is an empty region which is not used; therefore, there is a need for providing only a small capacity for it.

FIGS. 8A to 8C illustrate explanatory diagrams of an embodiment of the replacement process according to the present invention.

FIG. 8A illustrates an exemplary pattern provided to the spatial optical modulator 6. The left-side portion is a user region into which user data is to be written and the right-side long rectangular portion is a replacement region.

FIG. 8B illustrates an exemplary pattern detected by the two-dimensional image pickup device 7. When there is no defect, a pattern identical to the pattern in FIG. 8A is detected. However, if there are defects in the spatial optical modulator 6 or the two-dimensional image pickup device 7, the read-out data (page data B) will be different from the written data (page data A), which enables determining the positions of defective pixels as in FIG. 8B. Namely, it is possible to identify, as defective positions, the positions at which there is disagreement between the two kinds of data.

Then, the positions of detected defective pixels are recorded in a memory.

Then, when a data pattern is to be provided to the spatial optical modulator 6 subsequently, a pattern is created such that data to be written in the positions of detected defective pixels is moved to the replacement region as illustrated in FIG. 8C, and then the pattern is provided to the spatial optical modulator 6. Namely, a replacement process is executed.

For example, the defective pixels may be moved to the same rows within the replacement region as illustrated in FIG. 8C.

Further, when the pattern subjected to the replacement process is detected by the two-dimensional image pickup device, a process for restoring the data moved to the replacement region to the positions of the defective pixels is executed to reproduce the original data.

In step S11, specifically, the addresses of detected defective positions are stored, then the known pattern utilized in the self-diagnosis of type 1 is subjected to the replacing process, and then the self-diagnosis of type 1 is executed again. If no defect is detected by the second self-diagnosis of type 1, this means that the defects detected in step S1 have been addressed and thus normal recording and reproducing have been enabled. In such a case, the process proceeds to step S2.

On the other hand, if a defect is also detected by the second self-diagnosis of type 1, it is deemed that there is a problem which can not be overcome by the replacement process, and the process proceeds to step S21 where display or announcement is given to the user for informing him/her the fact that there is a need for repairs or there is a defect in the spatial optical modulator 6 or the two-dimensional image pickup device 7.

If no defect is detected in step S1, the process proceeds to step S2 where the self-diagnosis of type 2 is executed to determine whether or not there is a defect. If it is detected that there is a defect, the process proceeds to step S12 where a focus adjustment process is performed.

When the process proceeds to step S12, no defect has been detected by the self-diagnosis of type 1, but a defect has been detected by the self-diagnosis of type 2; therefore, it is highly likely that there is no defect in the spatial optical modulator 6 and the two-dimensional image pickup device 7, but the objective lens 9 has some problems.

When the objective lens 9 has a problem, it is deemed that, for example, the objective lens 9 has a flaw thus causing a problem in the refractive index thereof or that the actuator for driving the objective lens 9 to adjust the focus has a problem, etc.

In the case where the focus control by the actuator is not in conformity with the design standard, the focus may be corrected to be in conformity with the design standard by adjusting the position of the objective lens.

Figure 9C:
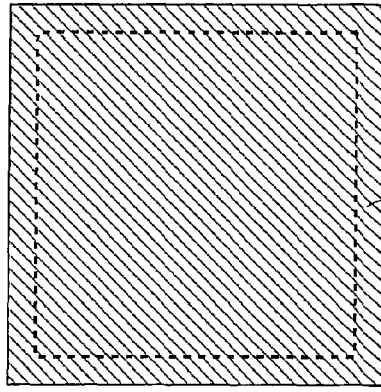
FIGS. 9A to 9C are explanatory diagrams of a focus adjustment process according to an embodiment of the present invention.
Figure 9B:
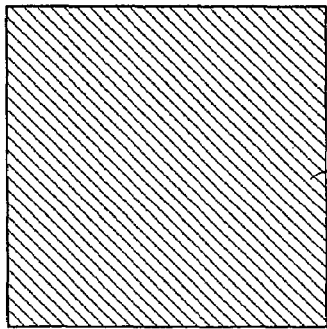
Figure 9A:
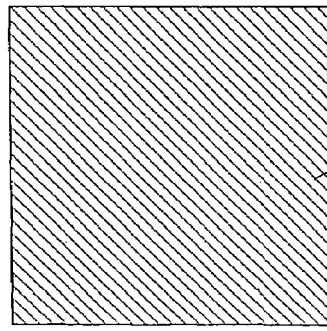

FIGS. 9A to 9C illustrate explanatory diagrams of a focus adjustment process according to the present invention.

FIG. 9A illustrates an example of the data pattern (pattern A) provided to the spatial optical modulator 6 prior to recording.

FIG. 9B illustrates an example of the data pattern (pattern B) received by the two-dimensional image pickup device. This is an ideal pattern in conformity with the design specification and, when the focus is adjusted in conformity with the design, it has the same size as that of the pattern A illustrated in FIG. 9A.

FIG. 9C illustrates an exemplary data pattern C received by the two-dimensional image pickup device 7 when there is a deviation in the focus. There is illustrated therein a case where the data pattern C has a greater size than that of the ideal data pattern A. The data outside of the size of the ideal pattern A illustrated by a broken line will not be normally received and even the data within the broken line may not be extracted as normal data in some cases, which may be detected as defects in the diagnosis process in step S2. Therefore, as the two-dimensional image pickup device 7, there is prepared a two-dimensional image pickup device with a size that is slightly greater than the size which enables reception of the ideal pattern A, in order to enable receiving the pattern C which is enlarged due to the deviation of the focus. Further, the ideal pattern size A that is in conformity with the design standard is prestored in a memory.

In the focus adjustment process in step S12, the size of the received pattern which is actually detected by the two-dimensional image pickup device 7 in the diagnosis process of type 2 in step S2 is determined. Next, the determined size is compared with the size of the ideal pattern prestored in the memory. If the comparison reveals that these sizes are in agreement with each other, it is deemed that the focus control itself is normal and therefore it is deemed that the defect detected in step S2 was caused by other reasons. Namely, the defect can not be eliminated by focus adjustments and therefore the process proceeds to step S21 where the user is given display or announcement of the fact that there is a need for repairs.

On the other hand, if these sizes are different from each other, there is a possibility that, by moving the objective lens 9 for adjusting the focus, the size of the detected pattern can be adjusted to the size in conformity with the design; therefore, the objective lens 9 is moved depending on the size deviation.

Namely, while the size of the pattern detected by the two-dimensional image pickup device 7 is monitored, the actuator of the objective lens 9 is controlled for adjusting the position of the objective lens 9 until the size of the detected pattern becomes equivalent to the size in conformity with the design. If the focus can not be ideally adjusted even by performing the focus adjustment, the process proceeds to step S21.

On the contrary, if the focus could be ideally adjusted by the aforementioned adjustment, the self-diagnosis of type 2 in step S2 is executed again to determine whether or not there is a defect. If there is no defect, the aforementioned focus adjustment was succeeded and the process proceeds to step S3.

On the other hand, if there is still a defect, the defect can not be repaired by focus adjustments and therefore the process proceeds to step S21 where the user is given display or announcement of the fact that there is a need for repairs.

If no defect is detected in step S2, the process proceeds to step S3 where the self-diagnosis of type 3 is executed to determine whether or not there is a defect. If a defect is detected at this time, the process proceeds to step S13 where a tilt adjustment process is performed.

When the process proceeds to step S13, no defect has been detected by the diagnosis processes of type 1 and type 2 which interpose no medium, but a defect has been detected by the diagnosis process of type 3 which interposes a medium, and therefore it is highly likely that the medium has a problem.

When the medium has a problem, it is deemed that the diagnosis region of the medium has a problem or that the tilt mechanism for fixing or moving and driving the medium has a problem.

When the tilt mechanism for the medium has a problem, there is a possibility that, by adjusting the position of the medium with the tilt mechanism, the defect detected by the diagnosis process of type 3 can be eliminated. Therefore, in the tilt adjustment process in step S13, the position of the medium is adjusted using the tilt mechanism and the diagnosis process of type 3 is repeatedly performed.

For example, there may be cases where the medium surface is not at an angle of 90° with respect to information light being directed to the medium. Therefore, the angle thereof is slightly varied and then the diagnosis process of type 3 is executed.

When the defect detected by the diagnosis of type 3 has been eliminated by varying the angle, it is deemed that the tilt adjustment has been succeeded, and thus the process proceeds to step S20 where the user is given display of the fact that it has been proven by diagnosis that there is no problem or that there was a problem but normal recording and reproducing have been enabled, and thus the user is informed that recording and reproducing are possible.

On the other hand, if a defect is still detected even after the angle is varied and the diagnosis of type 3 is executed a predetermined number of times, it is deemed that the defect can not be corrected by the tilt adjustment, and the process proceeds to step S21 where the user is informed the fact that there is a need for repairs.

As illustrated in FIG. 7, by combining the three diagnosis processes, it is possible to perform detection of problems and dissolution of the problems if possible. Also, the three diagnosis processes and the adjustment processes illustrated in steps S11, S12 and S13 can be automatically executed by a microcomputer, thus enabling easily executing diagnoses and adjustments of the apparatus without exerting a burden on the user. Also, the activation of the flow overall process of FIG. 7 can be executed with various timings as previously described.

Other Embodiments

The reflection-type collinear recording and reproducing apparatus illustrated in FIG. 13 directs two ring-shaped light beams to a medium and has specific problems which are different from those of the other apparatus.

Figure 10B:
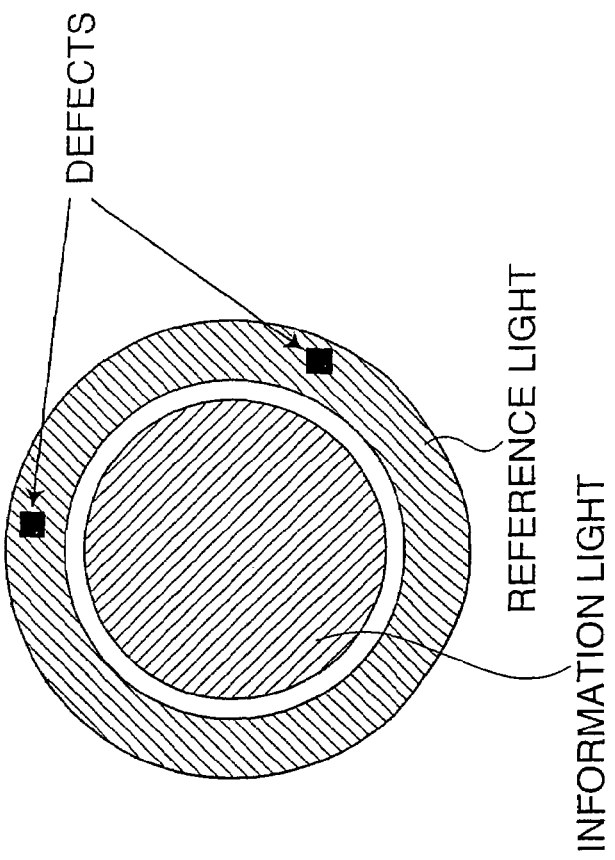
FIGS. 10A and 10B are explanatory diagrams of a data pattern of a collinear-type recording and reproducing apparatus according to an embodiment of the present invention.
Figure 10A:
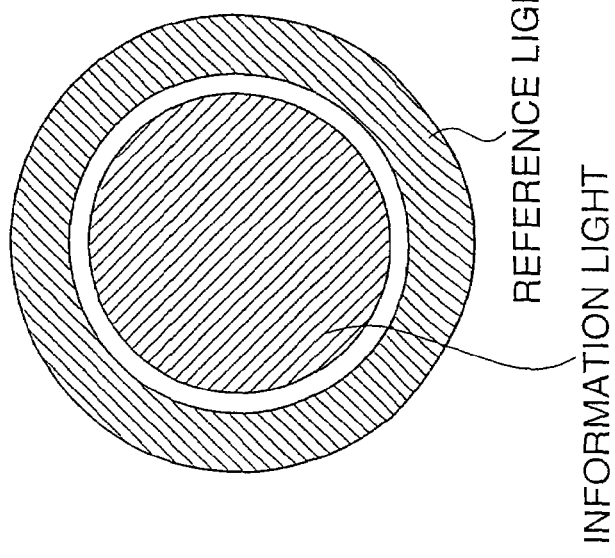

FIGS. 10A and 10B illustrate exemplary patterns of information light and reference light provided to the spatial optical modulator 6 in the collinear recording and reproducing apparatus.

FIG. 10A illustrates a pattern A when there is no defect in the spatial optical modulator 6, while FIG. 10B illustrates a pattern B when there are defects in the portion of the spatial optical modulator 6 which is irradiated with the outer-ring reference light.

Namely, in the case of FIG. 10B, reference light including such defects is directed to the medium and data presented by information light is recorded in the medium as interference fringes. In this case, if reference light including identical defects is directed to the medium during reproduction, the reproduction of the data is normally achieved.

In other words, even if there are defects in the portion of the spatial optical modulator 6 which is irradiated with reference light, recording and reproducing can be normally performed provided that the medium exists within the same apparatus. However, in the case where data is recorded in a medium using reference light passed through the spatial optical modulator 6 having such defects and then the medium is transferred to another apparatus and the data is reproduced therein, the reproduction can not be normally achieved.

If the spatial optical modulator 6 of the another apparatus has no defect, the medium will be irradiated with reference light based on the pattern A of FIG. 10A, and thus the data in the medium which was recorded on the basis of the pattern B different from the normal pattern A can not be normally reproduced.

Further, if there are defects in the spatial optical modulator 6 of an apparatus as illustrated in FIG. 10B, no problem will occur when recording and reproducing are performed by the same apparatus, which generally makes it difficult to recognize the existence of the defects. However, by executing any of the diagnosis processes according to the first to fourth embodiments of the present invention, it is possible to detect defects as illustrated in FIG. 10B.

For example, in the case where information light and reference light of the known pattern A of FIG. 10A are directed using the structure according to the first embodiment, in a collinear recording and reproducing apparatus, if the spatial optical modulator 6 and the two-dimensional image pickup device 7 are normal, then a data pattern identical to the pattern A can be detected.

On the other hand, if there are defects, then the two-dimensional image pickup device 7 detects an abnormal pattern B as illustrated in FIG. 10B and, by comparing the pattern A pre-stored in the memory with the detected pattern B, the positions of defects can be identified.

Consequently, if there are defects in the region of the spatial optical modulator 6 of an apparatus which is irradiated with reference light, reference light of the pattern B is always directed to a medium, and therefore information about the pattern B, particularly information about the defective positions in the reference-light-irradiation region in the pattern B is recorded in the medium.

When the medium is inserted to another apparatus and data is reproduced therein, it is possible to recognize, by reading out the information about defective positions therefrom, that the data has been recorded thereon using reference light of the pattern B. Thus, by selectively using reference light of the pattern B, not the pattern A, for reproducing, the data recorded on the medium can be reproduced even in other apparatuses.

According to the present invention, there are provided the optical-path changing part and the diagnosis part as described above, thus enabling easily and rapidly detecting malfunctions in the recording and reproducing components of the recording and reproducing apparatus, without exerting a burden on a user.

Further, when there is provided the component adjusting part as described above, it is possible to detect malfunctions and, additionally, to adjust components to correct the apparatus in order to prevent occurrences of defects.

Further, when there is provided the result outputting part as described above, it is possible to cause the user to rapidly take actions when repairs are required, which can prevent waste of the medium or time which would occur if the apparatus were continuously used under the existence of defects. Further, as previously described, the inspection of operation is started with the timing of the occurrence of various events, thus easily achieving early detection and early correction of malfunctions or early detection of malfunctions caused during usage, and the like without exerting a burden on a user.

What is claimed is:

1. A recording and reproducing apparatus comprising:
   a light source for emitting a light beam;
   a spatial modulating part for modulating the light beam to create information light, using spatial information associated with page data A to be recorded on a holographic recording medium;
   an optical-path changing part for changing an optical path of the information light created by the spatial modulating part;
   a light detecting part for receiving the information light having the optical path changed by the optical-path changing part; and
   a diagnosis part for inspecting operations of recording and reproducing components including the spatial modulating part and the light detecting part, using the page data A and page data B obtained from the information light received by the light detecting part.

2. The recording and reproducing apparatus according to claim 1, wherein
   the optical-path changing part is a beam splitter for turning the optical path of the information light created by the spatial modulating part toward the light detecting part.

3. The recording and reproducing apparatus according to claim 2, wherein
   the beam splitter is movably placed so as to allow the information light to travel toward a holographic recording medium during recording of page data on the medium and, so as to allow the information light to travel toward the light detecting part during inspection of the operations by the diagnosis part.

4. The recording and reproducing apparatus according to claim 1, wherein
   an optical lens for directing the information light to a predetermined position on the medium is provided on the optical path of the information light between the spatial modulating part and the holographic recording medium, and the optical-path changing part is provided between the spatial modulating part and the optical lens, so that the information light is received by the light detecting part without through the optical lens.

5. The recording and reproducing apparatus according to claim 4, wherein the optical-path changing part is constituted by a mirror and a beam splitter for passing the information light created by the spatial modulating part therethrough toward the holographic recording medium while turning the optical path of the information light reflected by the mirror toward the light detecting part, and the mirror is placed between the beam splitter and the optical lens.

6. The recording and reproducing apparatus according to claim 1, wherein
an optical lens for directing the information light to a predetermined position on the medium is provided on the optical path of the information light between the spatial modulating part and the holographic recording medium, and the optical-path changing part is provided between the optical lens and the medium, so that the information light passed through the optical lens is received by the light detecting part after the optical path thereof is changed by the optical-path changing part.

7. The recording and reproducing apparatus according to claim 6, wherein
the optical-path changing part is a movable mirror.

8. The recording and reproducing apparatus according to claim 1, wherein
the optical-path changing part is provided on a surface of the holographic recording medium, the optical-path changing part reflects the information light created by the spatial modulating part, and the reflected information light is received by the light detecting part.

9. The recording and reproducing apparatus according to claim 8, wherein
the optical-path changing part is a mirror.

10. The recording and reproducing apparatus according to claim 1, wherein
the optical-path changing part is a light transmitting part provided in the holographic recording medium, and the information light created by the spatial modulating part and directed to the light transmitting part is passed through the medium and then received by the light detecting part.

11. The recording and reproducing apparatus according to claim 1, wherein
the diagnosis part includes a storing part which prestores page data A consisting of known information, a comparing part for comparing the page data A with page data B obtained from the information light received by the light detecting part, and a defect detecting part for detecting whether or not there is a defect in the recording and reproducing components, on the basis of the result of the comparison.

12. The recording and reproducing apparatus according to claim 11, further comprising:
a result outputting part for outputting the result of detection by the defect detecting part.

13. The recording and reproducing apparatus according to claim 1, further comprising:
a component adjusting part which, when the diagnosis part determines that there is a malfunction of the operation of any of the recording and reproducing components, adjusts the component determined to have a malfunction.

14. The recording and reproducing apparatus according to claim 13, wherein
when the component determined to have a malfunction is the spatial modulating part or the light detecting part, the diagnosis part identifies the defective positions and the component adjusting part executes a replacing process for creating spatial information in which data to be recorded into the identified defective positions is shifted to a predetermined replacement region.

15. The recording and reproducing apparatus according to claim 1, wherein
the diagnosis part starts the inspection of the operations of the recording and reproducing components in the event of any of when it is detected that the power is turned on, when it is detected that a portable holographic recording medium has been inserted, when a recording request or a reproduction request is detected, every time when a constant time interval has elapsed at a state where the recording and reproducing operation is not performed, when the number of times that a malfunction of the recording operation or the reproducing operation is detected exceeds a predetermined number, when the temperature within the apparatus rises to a set temperature or more, when a shock sensor mounted to the inside of the apparatus detects a shock of a predetermined value or more and when a command for execution of a diagnosis process is input.

16. The recording and reproducing apparatus according to claim 1, wherein
the light beam emitted from the light source is a ring-shaped light beam consisting of a central first light beam and a second light beam formed around the first light beam, the first light beam is information light associated with page data to be written into the holographic recording medium, the second light beam is reference light for reading out page data recorded on the holographic recording medium, and the information light and the reference light are both incident on the spatial modulating part.

* * * * *